US012760907B2

(12) United States Patent
Reid

(10) Patent No.: US 12,760,907 B2
(45) Date of Patent: Oct. 13, 2026

(54) DOOR MECHANISM FOR A COOKING APPLIANCE

(71) Applicant: BREVILLE PTY LIMITED, Alexandria (AU)

(72) Inventor: Harrison Eugene Hamilton Reid, Alexandria (AU)

(73) Assignee: BREVILLE PTY LIMITED, Alexandria (AU)

( * ) Notice: Subject to any disclaimer, the term of this patent is extended or adjusted under 35 U.S.C. 154(b) by 631 days.

(21) Appl. No.: 18/029,264

(22) PCT Filed: Sep. 27, 2021

(86) PCT No.: PCT/AU2021/051122
§ 371 (c)(1),
(2) Date: Mar. 29, 2023

(87) PCT Pub. No.: WO2022/067378
PCT Pub. Date: Apr. 7, 2022

(65) Prior Publication Data

US 2024/0027075 A1 Jan. 25, 2024

(30) Foreign Application Priority Data

Sep. 30, 2020 (AU) ................................ 2020903533

(51) Int. Cl.
*F24C 15/02* (2006.01)
*E05F 5/02* (2006.01)

(52) U.S. Cl.
CPC ............ *F24C 15/022* (2013.01); *E05F 5/027* (2013.01); *F24C 15/023* (2013.01); *E05Y 2900/308* (2013.01)

(58) Field of Classification Search
CPC ...... F24C 15/022; F24C 15/023; E05F 5/027; E05F 1/1041; E05F 5/10; E05F 5/02;
(Continued)

(56) References Cited

U.S. PATENT DOCUMENTS 5,300,745 A * 4/1994 Chartrain ............. H05B 6/6417 219/722
2019/0178001 A1* 6/2019 Esterle ................. H05B 6/6417
2020/0217120 A1* 7/2020 Kozlovic .................. E05C 5/02

FOREIGN PATENT DOCUMENTS

CN 202641426 U 1/2013
GB 2563672 A 12/2018
(Continued)

OTHER PUBLICATIONS

German to English machine translation of WO_2016197163_A1.*
(Continued)

*Primary Examiner* — Michael G Hoang
*Assistant Examiner* — Elizabeth Ann Laughlin
(74) *Attorney, Agent, or Firm* — KDW FIRM PLLC

(57) ABSTRACT

A cooking appliance (100) that has a body (102) with an interior (114) for food to be cooked, and an opening (113) providing access to the interior. A door (101) attached to the body (102) to selectively open and close the opening (113), has a latch (106), and the body having a catch (202) for engaging the latch (106). The catch (202) is movable between a retracted position (238) and an extended position (236), and configurable in an engagement configuration for engaging the latch (106) and a release configuration for disengaging the latch. The body (102) having a biased member (214) to engage the catch (202) when the catch (202) is at the extended position (236). The biased member (214) is adapted to bias the catch (202) into the extended position (236) and bias the catch (202) to the release configuration.

12 Claims, 28 Drawing Sheets

(58) Field of Classification Search
CPC ................. E05F 3/04; E05Y 2900/308; E05Y 2201/412; E05Y 2400/354; E05Y 2400/445; E05Y 2900/30; E05Y 2201/638; E05Y 2800/24; E05B 17/0041; E05B 17/0025; E05B 2015/0406; E05B 2015/0431; E05B 15/04; E05B 61/00; E05C 5/00; E05C 19/024; H05B 6/6414; H05B 6/6417; A47J 37/0664
USPC .......................................................... 126/197
See application file for complete search history.

(56) References Cited

FOREIGN PATENT DOCUMENTS

| | | | | | |
|---|---|---|---|---|---|
| WO | 2012070023 | A1 | | 5/2012 | |
| WO | 2014066949 | A1 | | 5/2014 | |
| WO | WO-2016197163 | A1 | * | 12/2016 | ........... A47B 88/463 |
| WO | WO-2019006487 | A1 | * | 1/2019 | ........... H05B 6/6417 |
| WO | 2020048118 | A1 | | 3/2020 | |

OTHER PUBLICATIONS

Extended European Search Report for EP Application No. 21873722.9, dated Aug. 5, 2024, 10 pages.
International Search Report and Written Opinion for the International Application No. PCT/AU2021/051122, mailed Dec. 13, 2021, 14 pages.

* cited by examiner

DOOR MECHANISM FOR A COOKING APPLIANCE

CROSS-REFERENCE TO RELATED APPLICATIONS

This is a National Stage Application, filed under 35 U.S.C. § 371, of International Patent Application No. PCT/AU2021/051122, filed on Sep. 27, 2021, and which claims priority to Australian Patent Application No. 2020903533 filed on Sep. 30, 2020.

FIELD

The present invention relates to door mechanisms for cooking appliances and more particularly to a soft closing door mechanism for an oven such as a microwave oven.

BACKGROUND

Soft close oven doors utilise friction or damping elements to act against a door retraction mechanism to slow the final stages of the door moving to a closed position. When a latch extending from the oven door passes through a slot into the oven body, the latch is clasped by a soft close mechanism which then slowly draws the door closed by dampening the action of a retraction spring. Should the latch disengage from the soft close mechanism as it slowly retracts into the oven body, it may be impossible for the user to re-engage it. If the door latch cannot re-engage the internal catch, the door in unable to fully close the oven and a fault condition is triggered to prevent operation. As a result, the oven is inoperable until serviced by qualified personnel.

The present Applicant has sought to address these issues with the development of soft closing mechanisms such as those described in WO 2019006487 A1 filed 29 Jun. 2018, the entire contents of which is incorporated herein. While these door mechanisms provide securing engagement between the door latch and the internal catch within the body of the oven, it has been found that the mechanism can operate incorrectly if the door is subject to abnormal use such as unnecessarily rapid and forceful opening of the door.

When the oven door is closed, the door latch and the catch within the oven body are interengaged. Under normal use, opening an oven door with a soft close mechanism requires the door latch and internal catch to be drawn together from a retracted position to an extended position within the body of the oven. At the extended position, the catch reconfigures to a release configuration to allow the latch to disengage from the catch so the door may be fully opened. The catch needs to remain in the release configuration at the extended position until the door is re-closed whereupon the latch reengages with the catch and is slowly drawn to the retracted position to complete the soft closing operation.

Unfortunately, if the door is opened too quickly or forcefully, the catch does not remain in the release configuration after it disengages from the latch. If the catch is not in the release configuration, it is not able to re-engage the latch once the door is being re-closed. Furthermore, if the catch returns to the engaged configuration, it slowly retracts back to the retracted position despite not being with the door latch. As discussed above, this renders the oven inoperable until serviced by qualified personnel.

SUMMARY OF INVENTION

According to one embodiment, the invention provides a cooking appliance including:

- a body with an interior for food to be cooked, the body having an opening providing access to the interior;
- a door attached to the body to selectively open and close the opening, the door having a latch, and the body having a catch for engaging the latch, the catch being movable between a retracted position and an extended position, and the catch being configurable in an engagement configuration for engaging the latch and a release configuration for disengaging the latch; and,
- the body having a biased member to engage the catch when the catch is at the extended position; wherein,
- the biased member is adapted to bias the catch into the extended position and bias the catch to the release configuration.

Preferably, the latch is configured to disengage the biased member from the catch as the latch engages the catch.

Preferably, during use, contact between the latch and the catch as the door closes, moves the catch to the engaged configuration.

Preferably, during use the catch is in the engaged configuration when moving between the extended position and the retracted position.

Preferably, the body has a soft close mechanism for biasing the catch to the retracted position whereupon the door closes the opening.

Preferably, the soft close mechanism has a retraction spring and damper to slow movement of the catch to the retracted position by the retraction spring.

Preferably, the body has a guide structure for guiding the catch between the extended position and the retracted position, the guide structure being configured to rotate the catch into the release configuration at the extended position.

Preferably, the biased member has a swing arm and a torsion spring, such that the swing arm rotates into biased contact with the catch when in the extended position and the release configuration.

Preferably, the swing arm is mounted within the body such that contact with the latch as the door closes, rotates the swing arm away from the catch.

Preferably, the swing arm is configured for sliding contact with the latch, and the retraction spring has a bias exceeding any friction caused by the sliding contact.

In a second aspect, the present invention provides a cooking appliance including:

- a body with an interior for food to be cooked, the body having an opening providing access to the interior;
- a door attached to the body to selectively open and close the opening, the door having a latch, and the body having a catch for engaging the latch, the catch being movable between a retracted position and an extended position, and the catch being configurable in an engagement configuration for engaging the latch and a release configuration for disengaging the latch;
- the body having a guide structure defining a path for the catch between the retracted position and the extended position, and a retraction means for applying a bias to the catch toward the retracted position; wherein,
- the bias is a force inclined to the path at the extended position such that the force has a component parallel to the path at the extended position and another component biasing the catch to the release configuration.

Preferably, the retraction means is a soft close mechanism with a retraction spring and a damper to slow movement of the catch to the retracted position under the bias of the retraction spring.

Preferably, the damper is an oil cylinder with piston connected to a rod attached to the catch.

Preferably, the guide structure is configured to rotate the catch onto the release configuration at the extended position, and during use, contact between the latch and the catch as the door closes, moves the catch to the engaged configuration.

According to a third aspect, the present invention provides a cooking appliance including:

- a body with an interior for food to be cooked, the body having an opening providing access to the interior;
- a door attached to the body to selectively open and close the opening, the door having a latch, and the body having a catch for engaging the latch, the catch being configurable in an engagement configuration for engaging the latch and a release configuration for disengaging the latch; and,
- the body further including a safety lock movable between a locked position in which the catch is held in the release configuration and an unlock position allowing the catch to move to the engagement configuration, the safety lock being biased to the lock position; wherein during use,
- the safety lock is moved to the unlocked position by the latch moving into engagement with the catch.

Preferably, the safety lock has an inclined surface for engaging the latch moving towards the catch such that sliding contact between the latch and the inclined surface pushes the safety lock to the unlock position.

Preferably, the safety lock has an abutment for contacting the catch to prevent movement of the engagement configuration.

Preferably, the catch is movable between a retracted position and an extended position such that the catch is in the release configuration at the extended position.

Preferably, the body has a guide structure for guiding the catch between the extended position and the retracted position, the guide structure being configured to rotate the catch into the release configuration at the extended position.

Preferably, the body has a soft close mechanism for biasing the catch to the retracted position whereupon the door closes the opening.

Preferably, the soft close mechanism has a retraction spring and damper to slow movement of the catch to the retracted position by the retraction spring.

In a fourth aspect, the present invention provides a cooking appliance including:

- a body with an interior for food to be cooked, the body having an opening providing access to the interior;
- a door attached to the body to selectively open and close the opening, the door having a latch, and the body having a catch for engaging the latch, the catch being movable between a retracted position and an extended position, and the catch being configurable in an engagement configuration for engaging the latch and a release configuration for disengaging the latch; and
- the body having a guide structure defining a path for the catch between the retracted position and the extended position, and a retraction means for applying a bias to the catch toward the retracted position; wherein,
- the guide structure has a localised formation in the path configured to increase friction between the catch and the guide structure when the catch is in the extended position and biased to the retracted position by the retraction means.

Preferably, the localised formation is a localized deviation from the path directly to the retracted position.

Preferably, the path directly to the retracted position is parallel to the bias applied by the bias means, and the localised deviation is inclined to the bias.

Preferably, the localized deviation is a ramp between two sections of the path. Preferably, during use, the path is generally horizontal and the ramp deviates the catch upwards when moving from the extended position to the retracted position.

BRIEF DESCRIPTION OF DRAWINGS

Preferred embodiments of the present invention will now be described by way of example only with reference to the accompanying figures in which.

DESCRIPTION OF EMBODIMENTS

Figure 1:
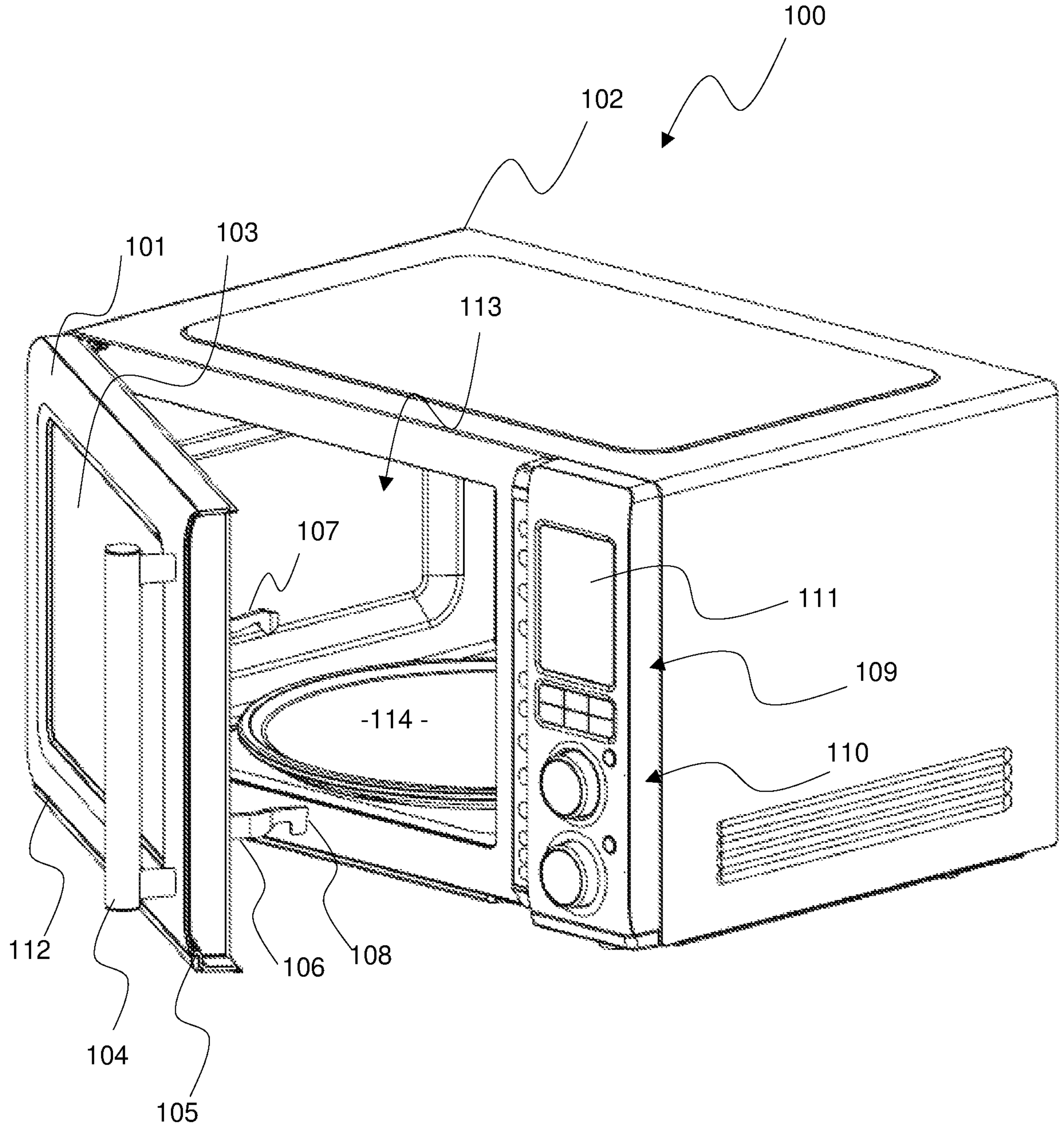
FIG. 1 is a perspective view of a microwave oven with an open door having two latch blades extending therefrom.

FIG. 1 shows an oven such as a microwave oven 100 with a hinged door 101 attached to the main body 102 by hinges on the left side of the oven opening 113. The opening 113 leads to an interior 114 or cavity where food to be cooked is placed. The door 101 has a frame 112 surrounding a central window 103. One vertical external portion 105 of the frame 112 carries a handle 104. The same vertical portion 105 of the frame 112 carries a pair of latches in the form of latch blades 106 and 107. When the door swings closed, the latch blades 106 and 107 enter the main body 102 through cooperating slots 210 (see FIG. 2) such that the head 108 of the lower latch blade 106 interengages with a catch 202. The catch is drawn further into the body 102 of the oven 100 by a retraction mechanism in the form of a soft close mechanism 200 so that the door moves to close the opening 113 at a controlled rate. The oven 100 also has a user interface 109 having both user inputs 110 and a display 111, for example a graphic display screen.

Spring Biased Arm

Figure 2:
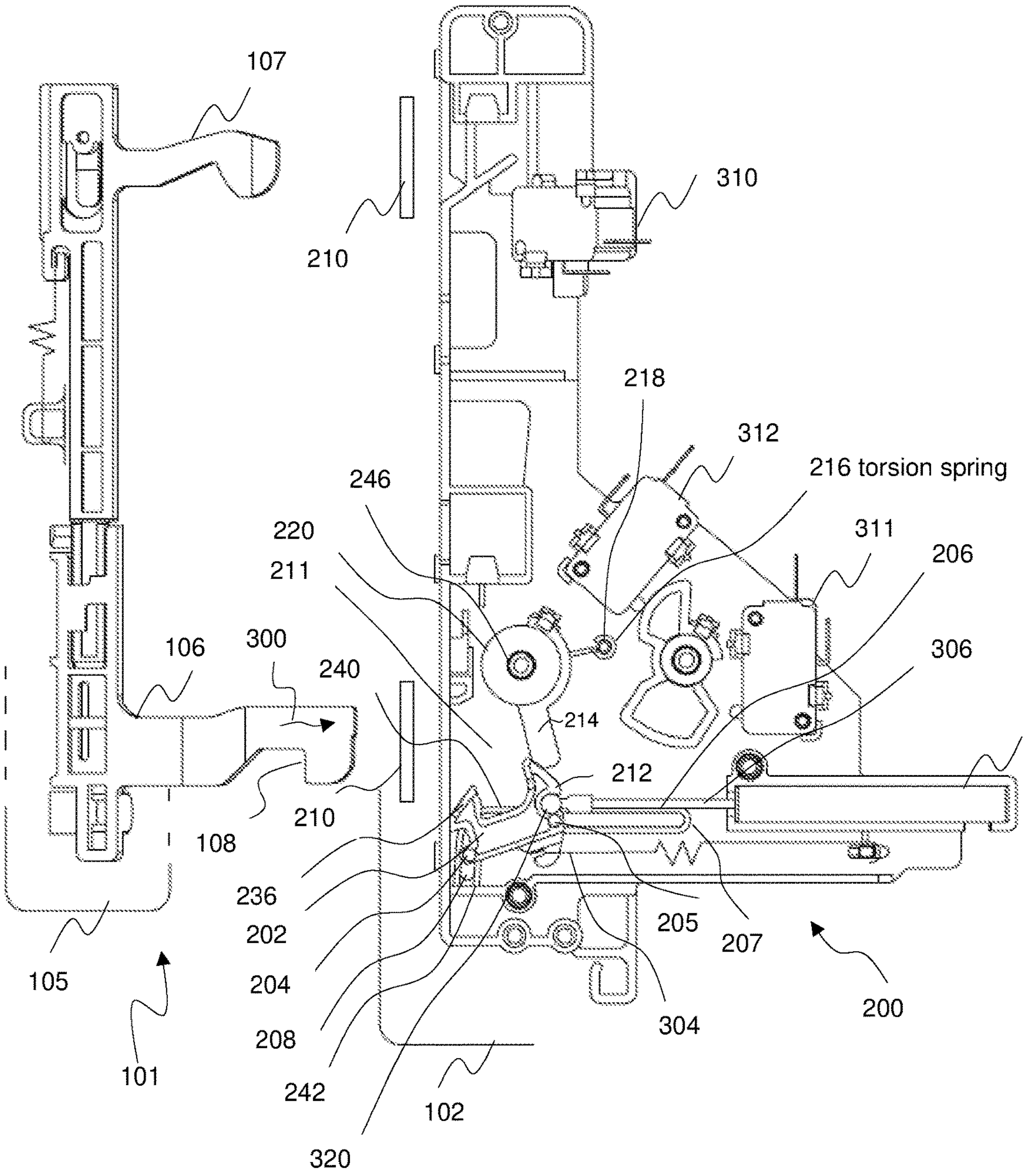
FIG. 2 is a partial section view of a first embodiment showing the door partially open and prior to engagement between the lower latch blade and the catch.

FIGS. 2 to 10 show embodiment of the invention in which a spring biased arm assembly is used to urge the catch 202 into its release configuration, and into the extended position 236 (as shown in FIG. 2).

As the door 101 closes, the lower latch blade 106 extends into the body 102 of the oven 100 through slot 210. The head 108 of the lower latch blade 106 has a general hook-shaped configuration for engagement with the recess 211 of the catch 202. The catch 202 is configured such that the distal end of the lower latch blade 106 contacts a trigger formation 209 of the catch 202. The trigger formation 209 is positioned in the path of the latch blade 106 as it moves in the closing direction 300. As the latch blade pushes the trigger formation, the catch 202 rotates in a controlled manner to an engagement configuration in accordance with the guide track 206 in the body 102.

The catch 202 is provided with a forward pin 204 and a rearward pin 205 extending from both sides of the catch 202 to slide in the track 206. It will be understood by skilled workers that the track 206 is in fact two parallel tracks on either side of the catch 202, but in the interests of clarity, only one side of the track 206 is shown. The track 206 defines a path 240 between the extended position 236 and the retracted position 238 (see FIGS. 4 and 5). The track 206 also has a branch 242 extending from the path 240 for the forward pin 204 so the catch 202 rotates to the engagement configuration when in the extended position 236.

Figure 3:
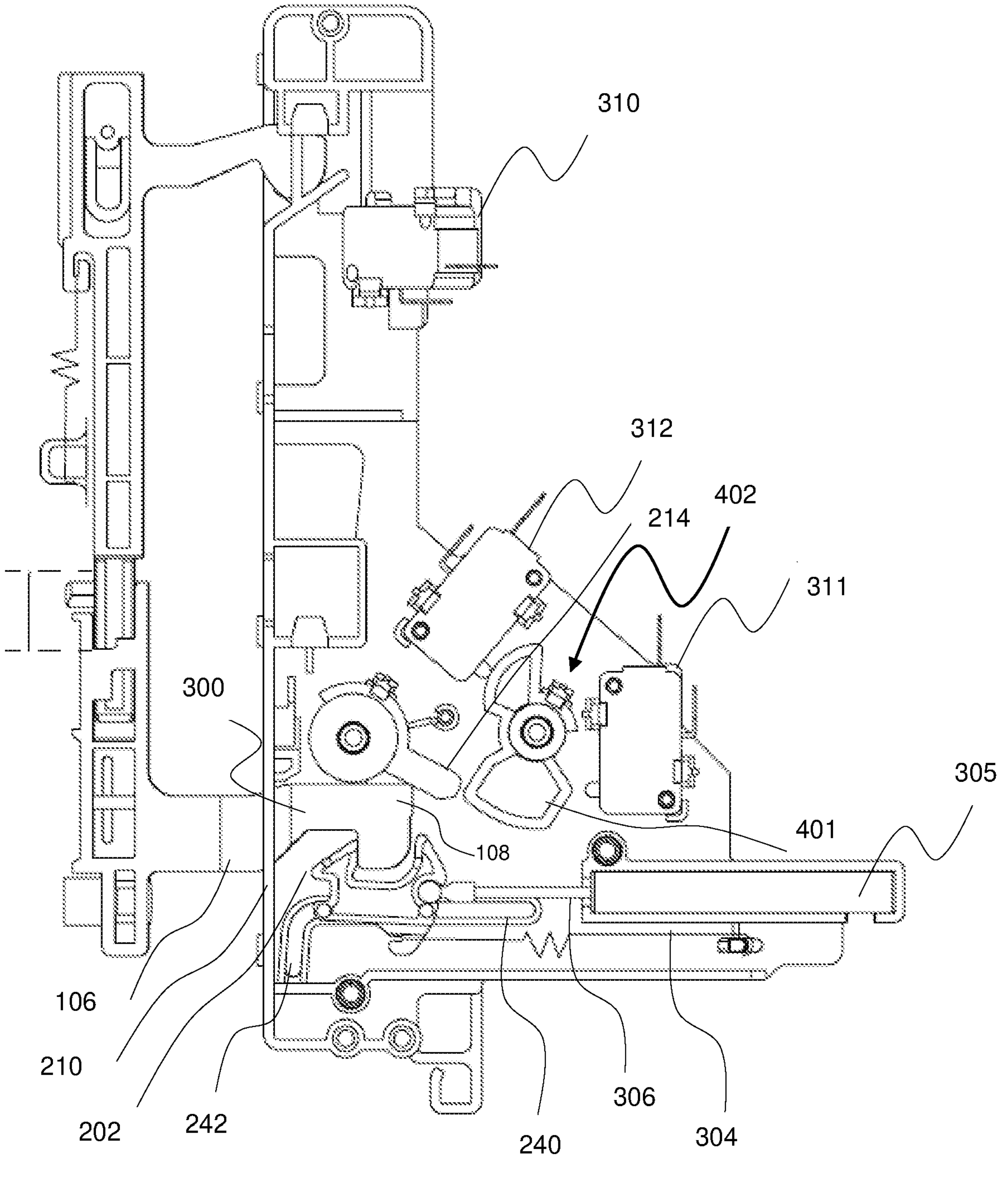
FIG. 3 is a partial section view of the first embodiment with the lower latch blade of the door engaging the catch, and simultaneously disengaging the swing arm from the catch.
Figure 7:
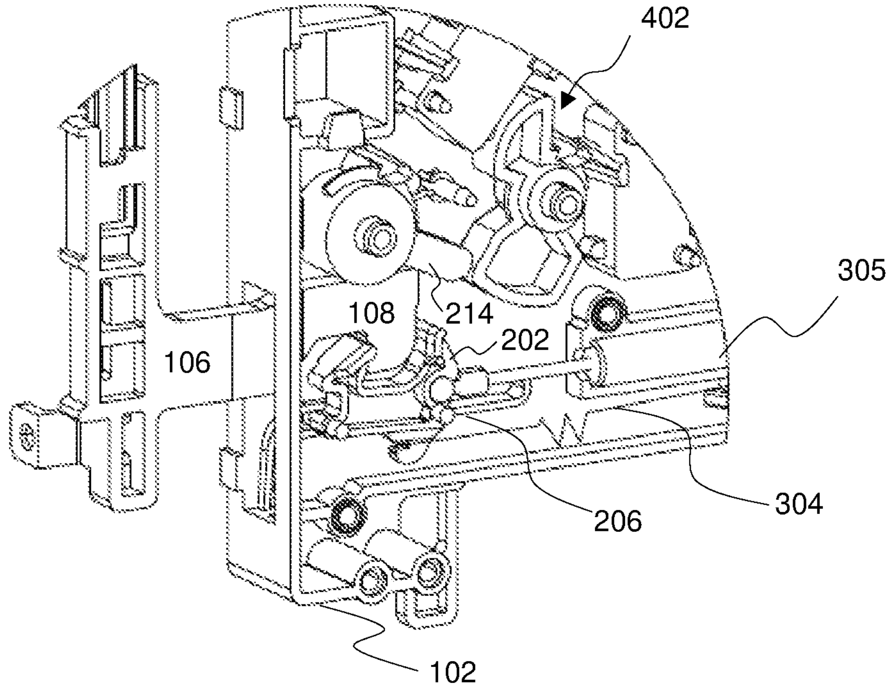
FIG. 7 is a partial sectioned perspective view of the first embodiment showing the lower latch blade of the door engaging the catch, and simultaneously disengaging the spring biased swing arm from the catch, as shown in FIG. 3.
Figure 8:
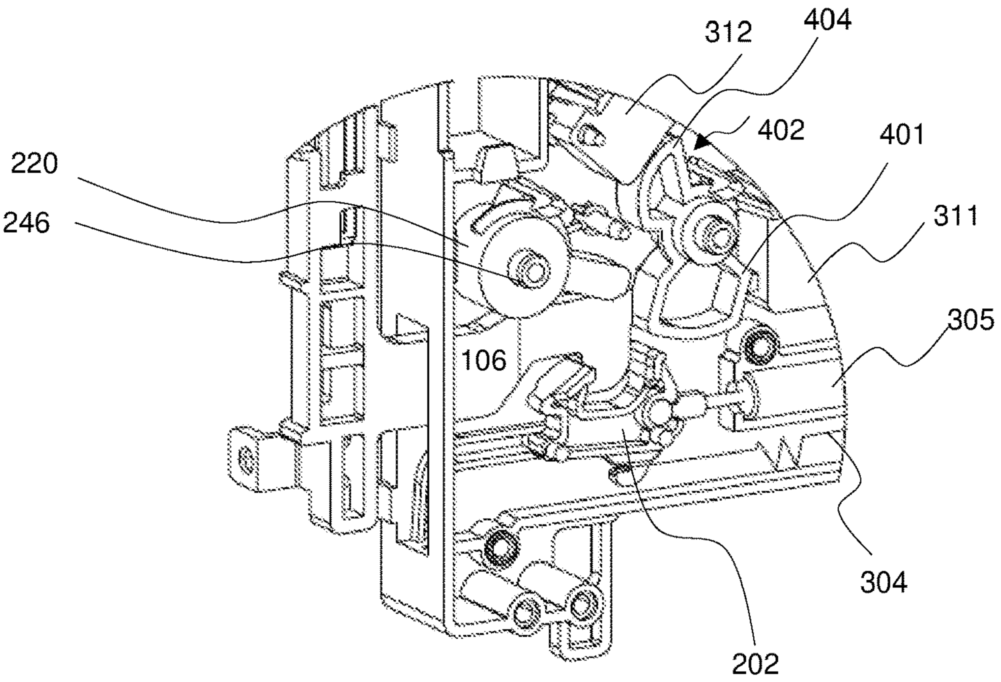
FIG. 8 is a partial sectioned perspective view of the first embodiment showing the lower latch blade of the door engaged with the catch moving to the retracted position as shown in FIG. 4.
Figure 9:
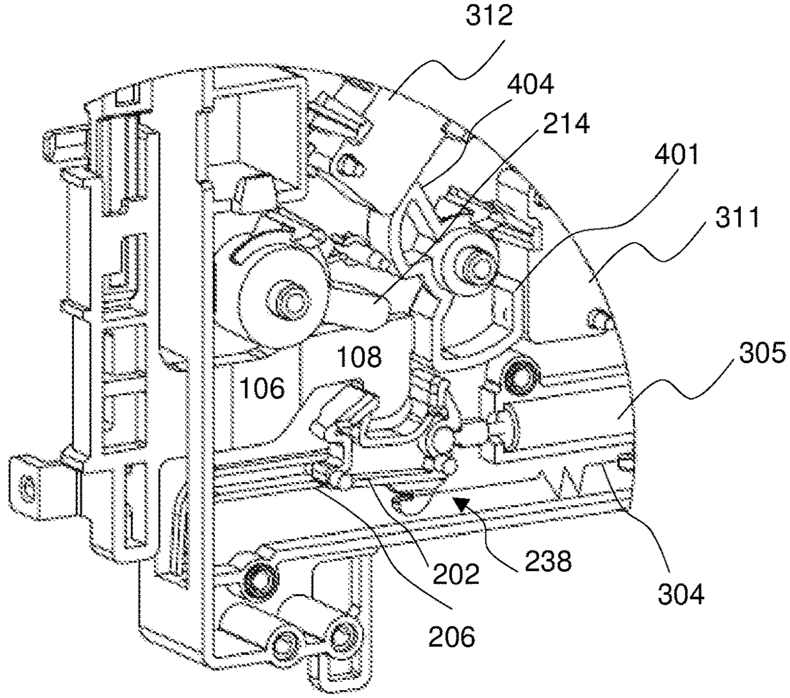
FIG. 9 is a partial sectioned perspective of the first embodiment showing the lower latch blade engaged with the catch at the retracted position such that the door is in the close position as shown in FIG. 5.

As the lower latch blade 106 presses against the trigger formation 209, the catch 202 moves away from the extended position 236 and towards the retracted position 238. Moving towards the retracted position rotates the catch 202 from the release configuration to the engagement configuration (see FIGS. 3, 4, 5, 7, 8 and 9). In the engagement configuration, the head 108 of the lower latch blade 106 is retained in the recess 211. As best shown in FIGS. 3 and 7, pressing the head 108 of the lower latch blade 106 onto the trigger formation 209 of the catch 202 also disengages the swing arm 214 from the catch 202.

Figure 4:
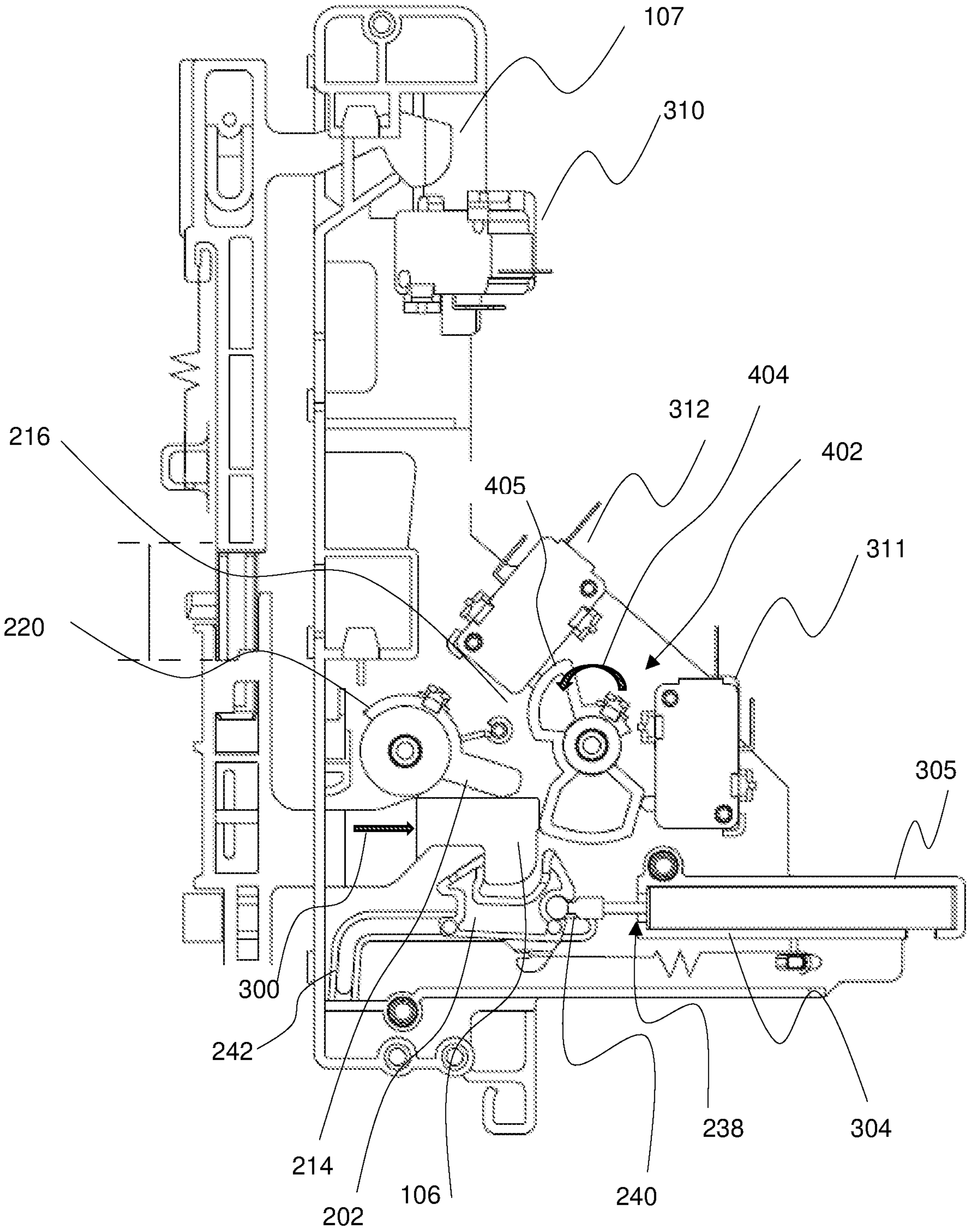
FIG. 4 is a partial section view of the first embodiment showing the lower latch blade of the door moving to the retracted position and engaging one lobe of the rotating cam for actuating the safety switches.
Figure 5:
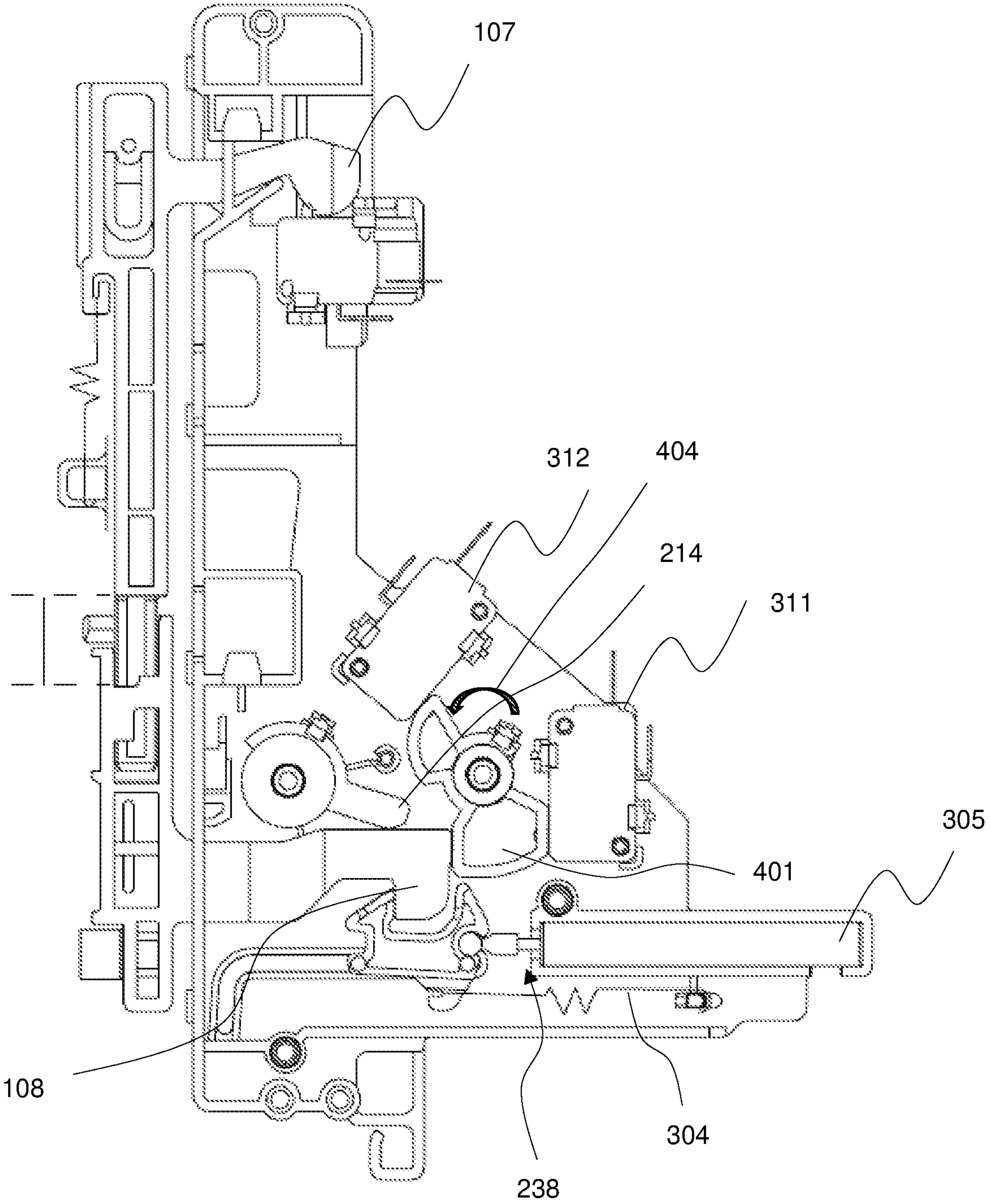
FIG. 5 is a partial section view showing the door in the closed position with the lower latch blade and the catch in the retracted position within the oven body.
Figure 6:
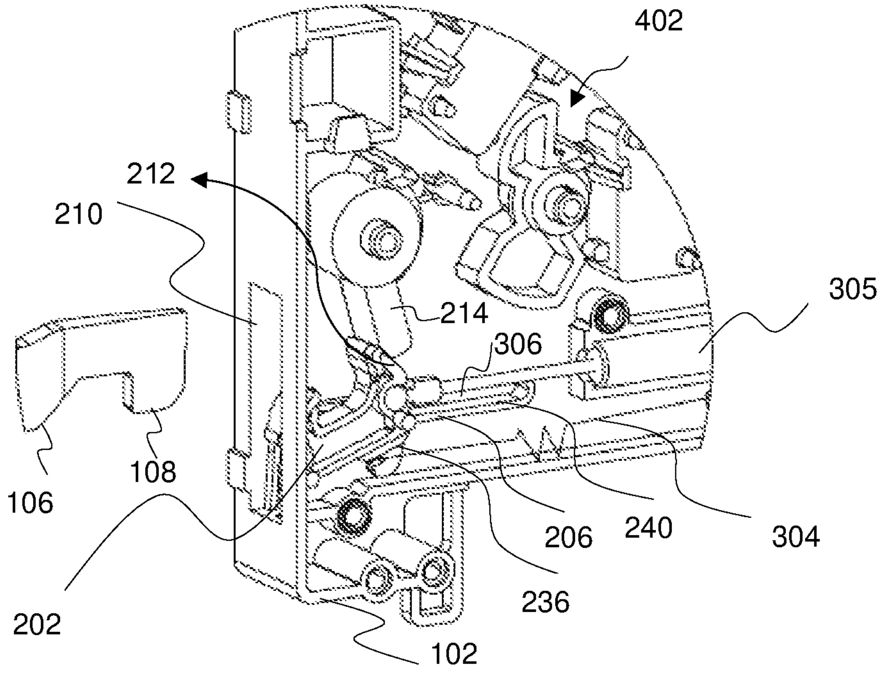
FIG. 6 is a partial section perspective view of the first embodiment showing the lower latch blade of the door prior to entering the body of the oven as shown in FIG. 2.

A retraction spring 304 is mounted within the oven body 201 and attached to the catch 202 to bias the catch 202 towards the retracted position 238 (see FIGS. 4 and 5). A damper in the form of an oil cylinder 305 with connecting rod 306 extending between a piston in the oil cylinder to the catch 202 slows and control the movement of the catch 202 towards the retracted position 238. This provides an effective soft close mechanism for the door as it moves into a closed position (see FIG. 5) covering the opening 113 of the oven body 201.

As shown in FIGS. 4 and 5, the head 108 of the lower latch blade 106 engages with the rotatable cam 402 as it moves in the closing direction 300. Rotatable cam 402 has two lobes 401 and 404 both of which are used to activate switches 311 and 312 which inform the processor (not shown) that the door is in the closed position. As the latch blade 106 pushes the lower lobe 401, the cam 402 rotates in a switch activation direction 404 to depress respective buttons on the switches 311 and 312. The upper latch blade 107 independently depresses the button on switch 310 when the door 101 is closed. However, it will be appreciated that the lower latch 106 needs to be engaged with the catch 202 as it moves to the retracted position 238 in order for the switches 311 and 312 to be activated.

As discussed above in the background section, if the door is opened too quickly or with too much force, the retraction mechanism such as that shown in WO 2019006487 A1 can fail to retain the catch 202 in the release configuration. If the catch 202 returns to the engaged configuration after releasing the lower latch 106, it retracts to the retracted position 238. Here the catch 202 forms an obstruction preventing the lower latch 106 from fully closing and activating the switches 311 and 312. Without feedback from the switches 310, 311 and 312, indicating the door is closed, the processor prevents operation of the oven.

As shown in FIGS. 2 to 10, the arm 214 is biased against the latch blade 106 as the door 101 opens, until the catch 202 rotates to the release configuration whereby the latch blade disengages and moves away from the catch. This allows the arm 214 to contact the curved rear edge 212 of the catch 202 and the bias of the torsion spring 216 simultaneously urges the catch 202 into the release configuration, and into the extended position 236. This is more reliable than prior art systems using only the bias of the retraction spring to generate sufficient friction between the forward pin 204 and the guide track 206 to maintain the catch 202 at the extended position 236 (e.g. as shown in WO2019006487 A1).

Figure 10:
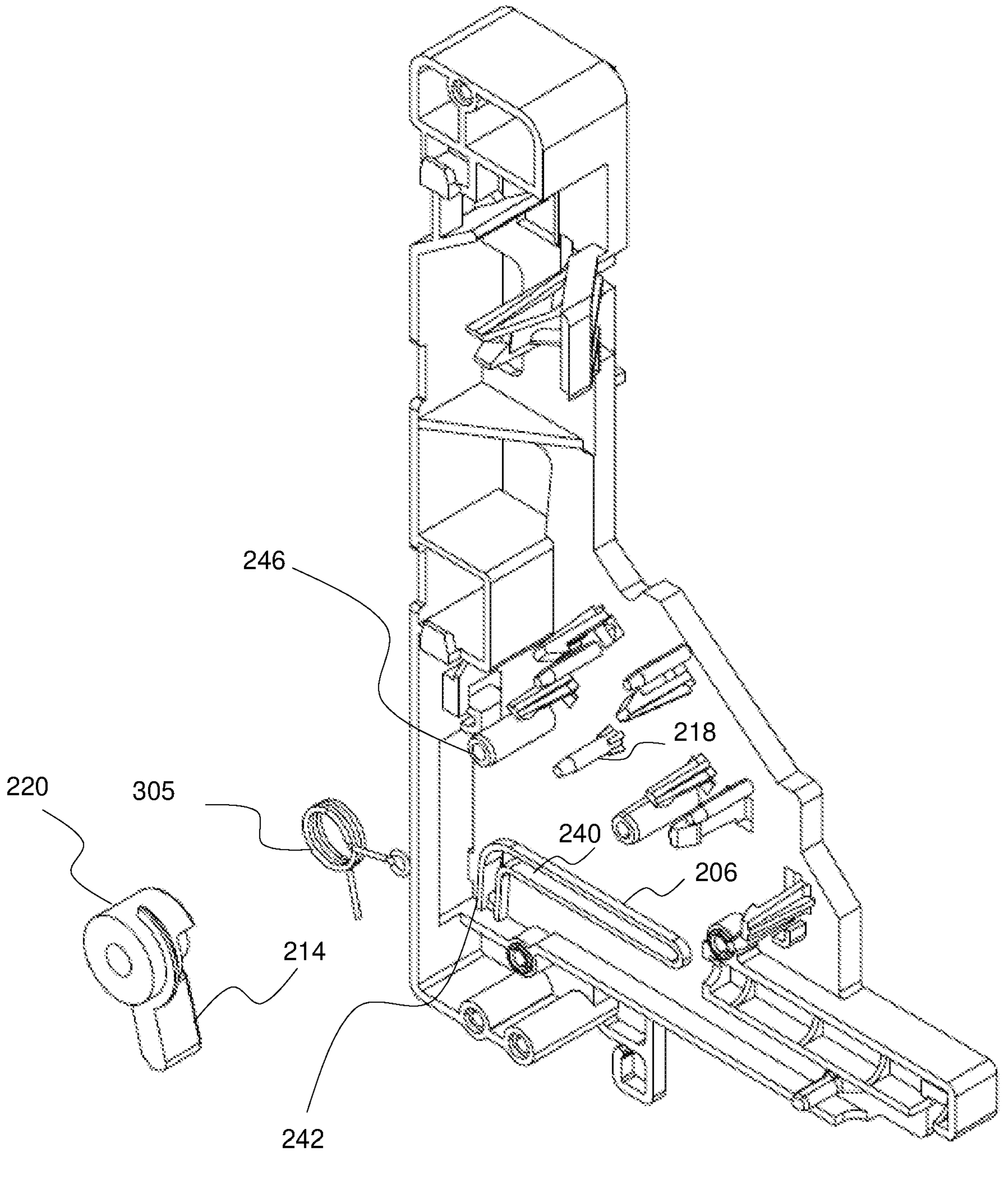
FIG. 10 is an exploded partial perspective of the swing arm and the torsion spring for biasing the catch into the extended position, and the release configuration.
Figure 11:
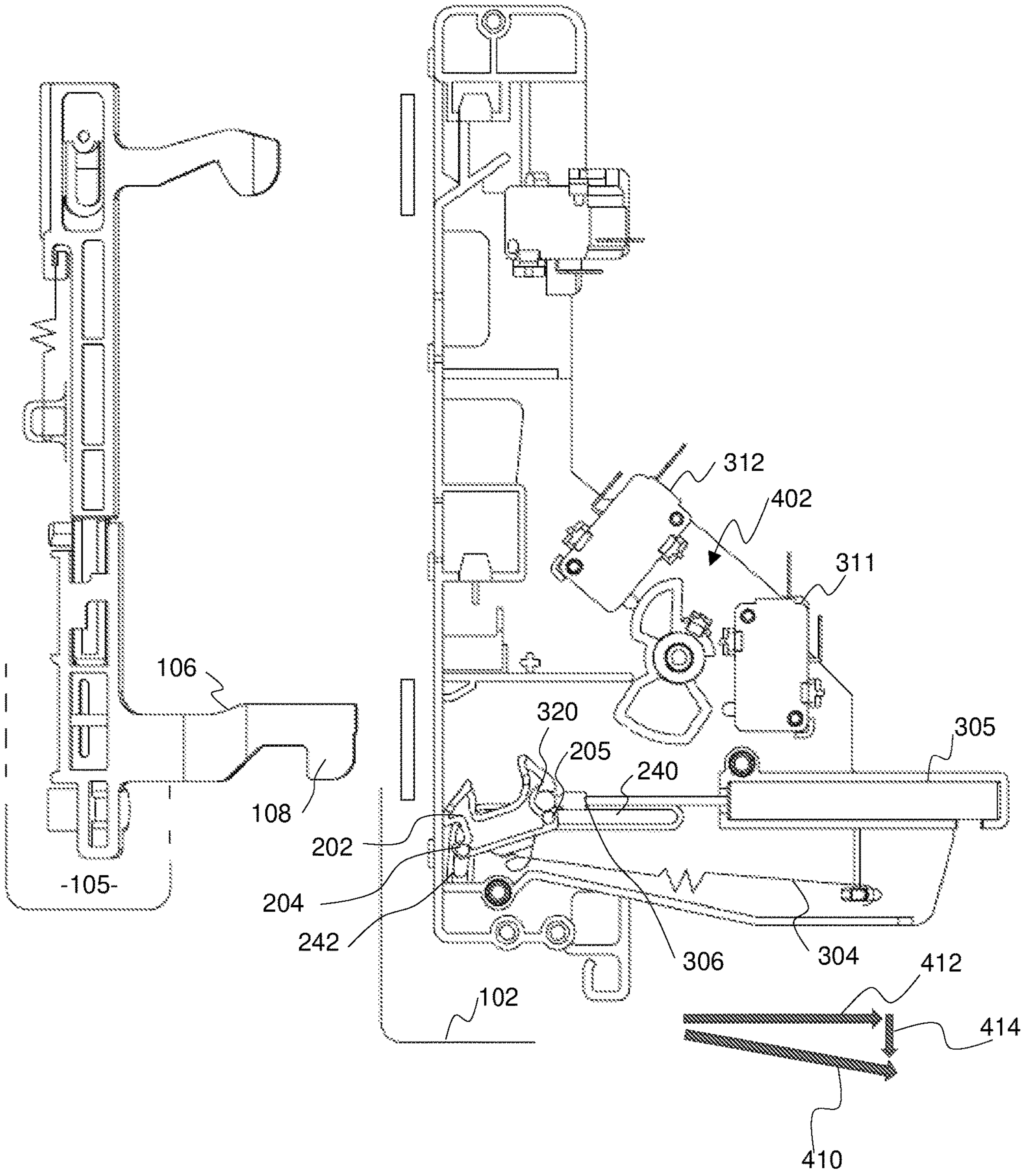
FIG. 11 is a partial section view of a second embodiment showing the upper and lower latch blades of the door prior to entering the oven body.
Figure 12:
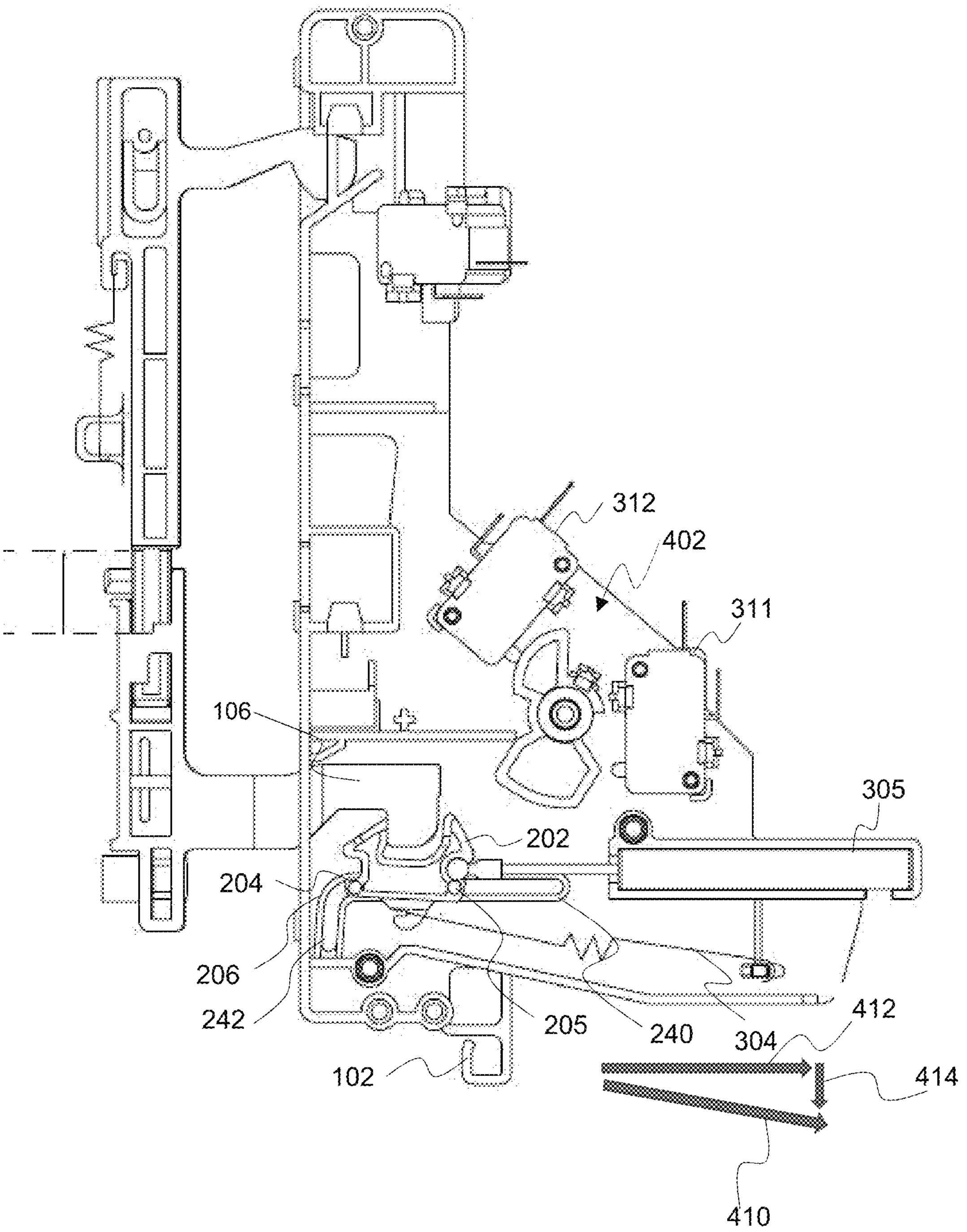
FIG. 12 is a partial sectional view of the second embodiment showing the lower latch blade of the door engaging the catch, and simultaneously rotating the catch to the engaged configuration.
Figure 13:
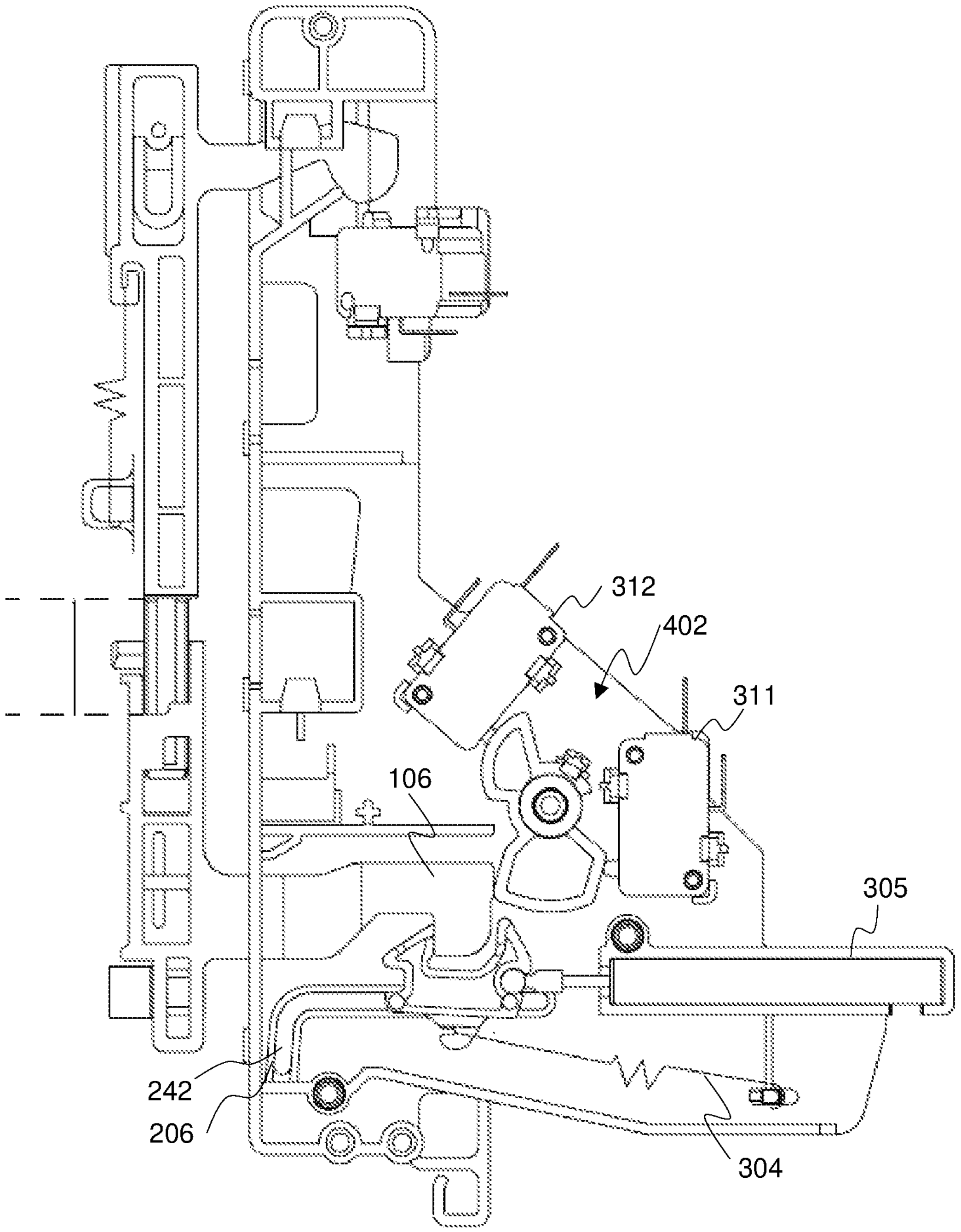
FIG. 13 is a partial section view of the second embodiment showing the lower latch blade of the door moving to the retracted position and engaging one lobe of the rotating cam for actuating the safety switches.
Figure 14:
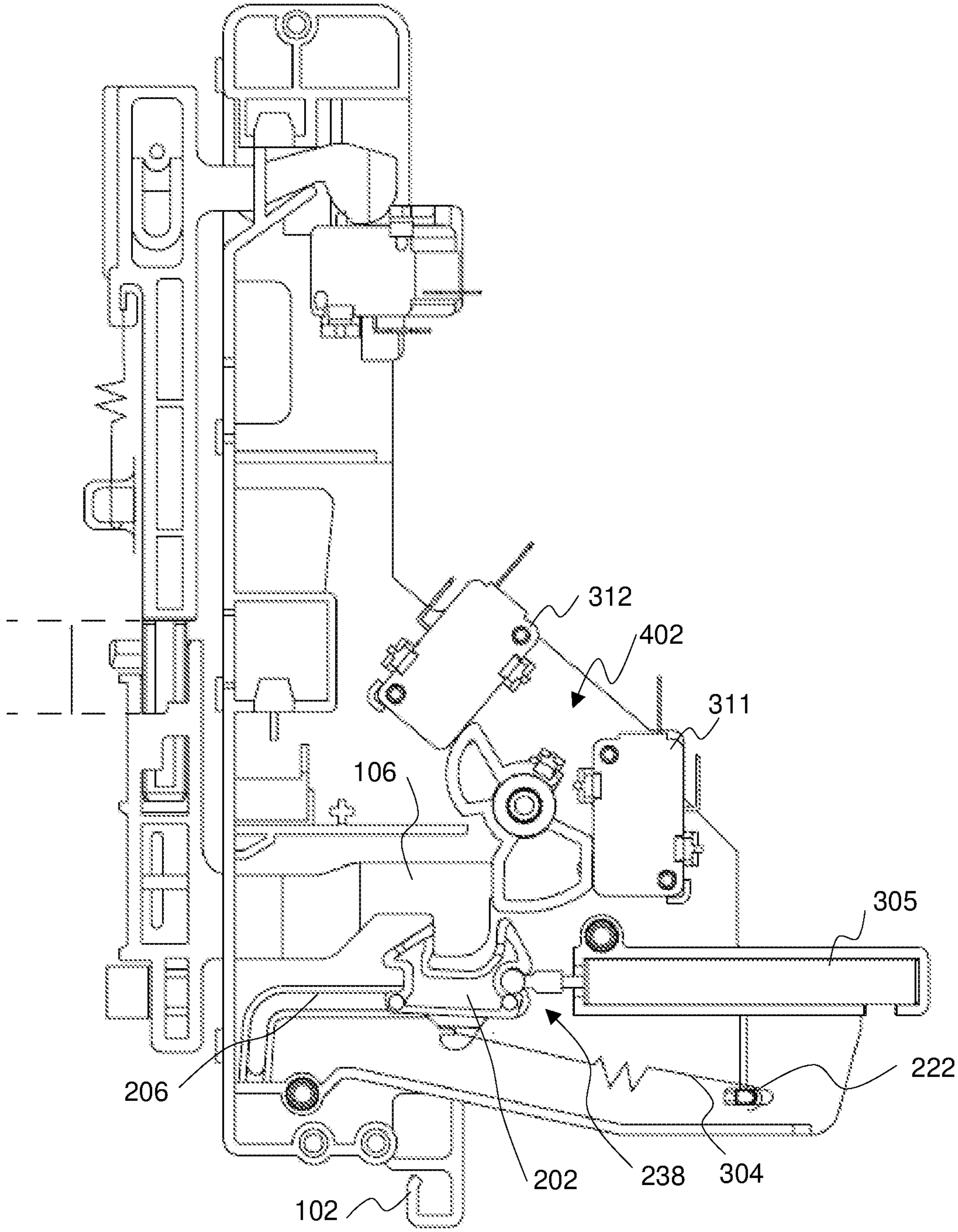
FIG. 14 is a partial section view of the second embodiment showing the door in the closed position with the lower latch blade and the catch in the retracted position within the oven body.
Figure 15:
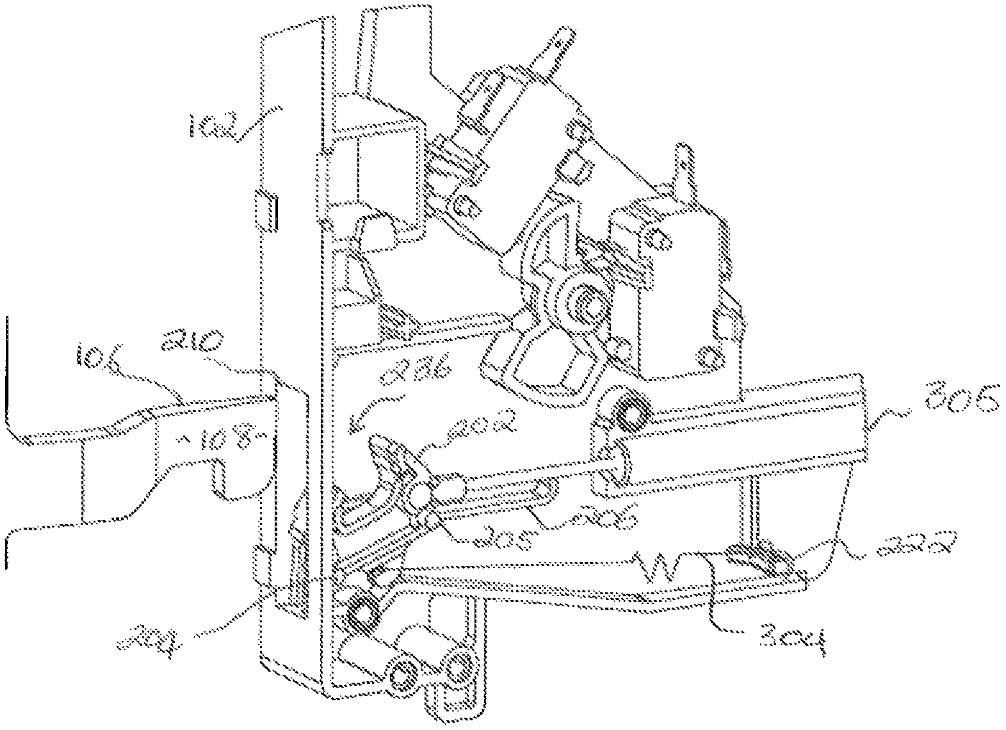
FIG. 15 is a partial section perspective view of the second embodiment showing the lower latch blade of the door prior to entering the body of the oven as shown in FIG. 11.
Figure 16:
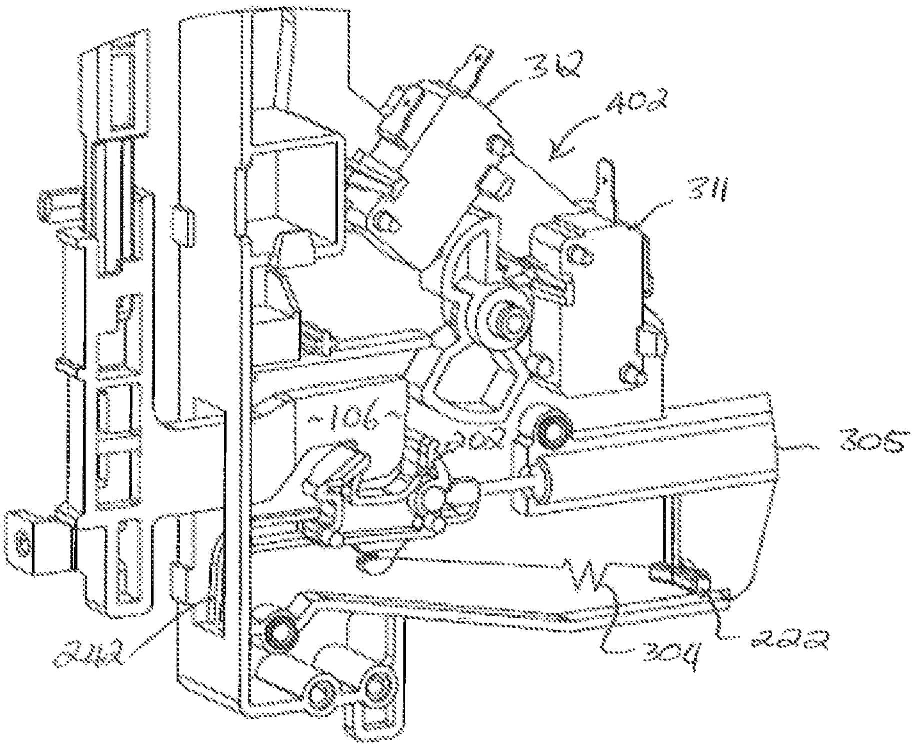
FIG. 16 is a partial sectioned perspective view of the second embodiment showing the lower latch blade of the door engaging the catch, and simultaneously rotating the catch to the engaged configuration, as shown in FIG. 12.
Figure 17:
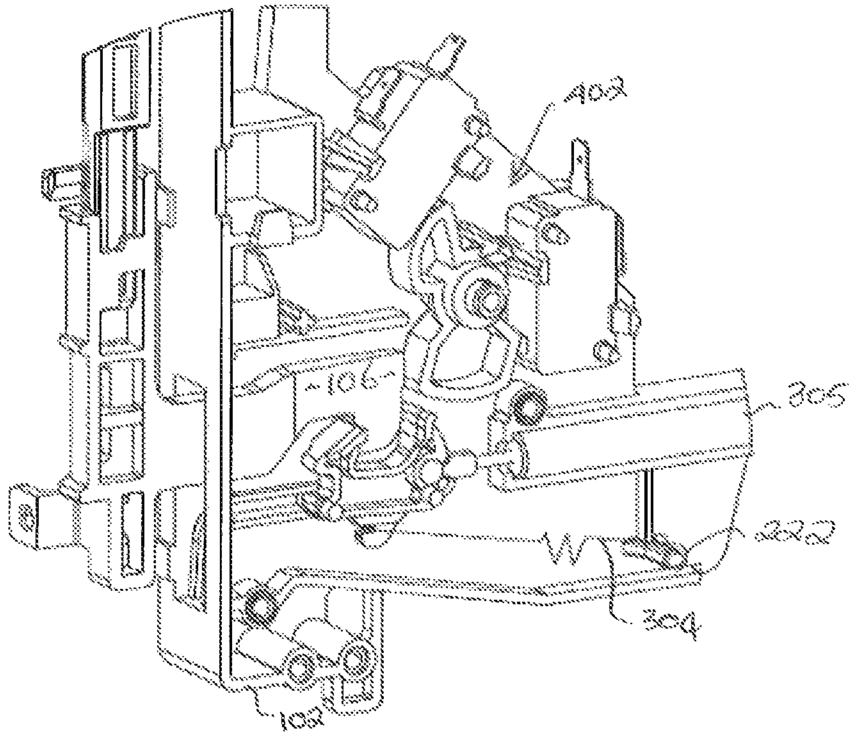
FIG. 17 is a partial sectioned perspective view of the second embodiment showing the lower latch blade of the door engaged with the catch moving to the retracted position as shown in FIG. 13.
Figure 18:
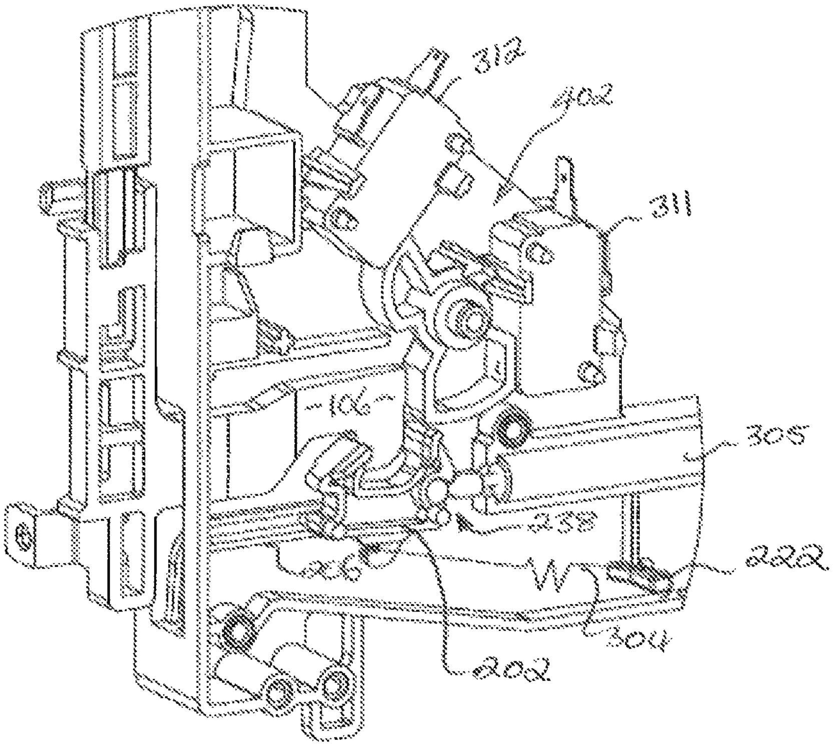
FIG. 18 is a partial sectioned perspective of the second embodiment showing the lower latch blade engaged with the catch at the retracted position such that the door is in the close position as shown in FIG. 14.

As best shown in FIG. 10, the arm 214 radially extends from a spring housing 220 rotatably mounted to the spigot 246. Torsion spring 216 has an end attached to the spring anchor 218 and its other end extending into the arm 214 while the coils of the spring sit within the cylindrical body of the spring housing 220. The spring 216 is selected to provide a bias on the arm 214 that is strong enough to reliably hold the catch at the extended position and in the release configuration, but not so strong that friction from sliding contact between the arm 214 and the latch blade 106 does not prevent retraction of the catch 202 by the retraction spring 304. Furthermore, the swing arm 214 has a contacting surface of complementary shape to the curved rear edge 212 to better hold the catch 202 against unintended movement.

Angled Retraction Spring

FIGS. 11 to 18 show a second embodiment of the cooking appliance door mechanism in which the retraction spring 304 is angled to better hold the catch 202 in the release configuration. The co-operation of the door latch blades 107 and 106 and the oven body 102 is the same as that of the first embodiment described above in relation to FIGS. 2 to 10, apart from the biased swing arm. The biased swing arm of the first embodiment may or may not be used together with this embodiment, but in the interests of clarity, structural elements of the first, third and fourth embodiments have been omitted from FIGS. 11 to 18.

In this embodiment, the retraction spring 304 is configured to provide a bias force to retract the catch 202 to the retracted position, and also bias the catch 202 to the release position 236 when the catch 202 is in the release position 236. In this way, the retraction spring 304 is providing a biased member biasing the catch to the release configuration and simultaneously the extended position, while also providing the bias needed to draw the catch to the retracted position.

As shown in FIGS. 12 to 18, engagement with the latch blade 106 easily exceeds the additional bias to the release configuration provided by the component 414 normal to the path 240. As with the first embodiment, the head 108 of the latch blade 106 is retained by the catch 202 in the engagement position and drawn to the retracted position 238 by the bias component 412 parallel to the path 240 defined by the guide structure 206. The inclination of the retraction spring 304 adds some addition friction due to the bias component 414, but not enough to prevent movement of the catch 202 along the guide structure 206. This is achieved with careful selection of spring stiffness and the inclination of the spring to the path 240.

Localised Feature in Guide Structure

Figure 19:
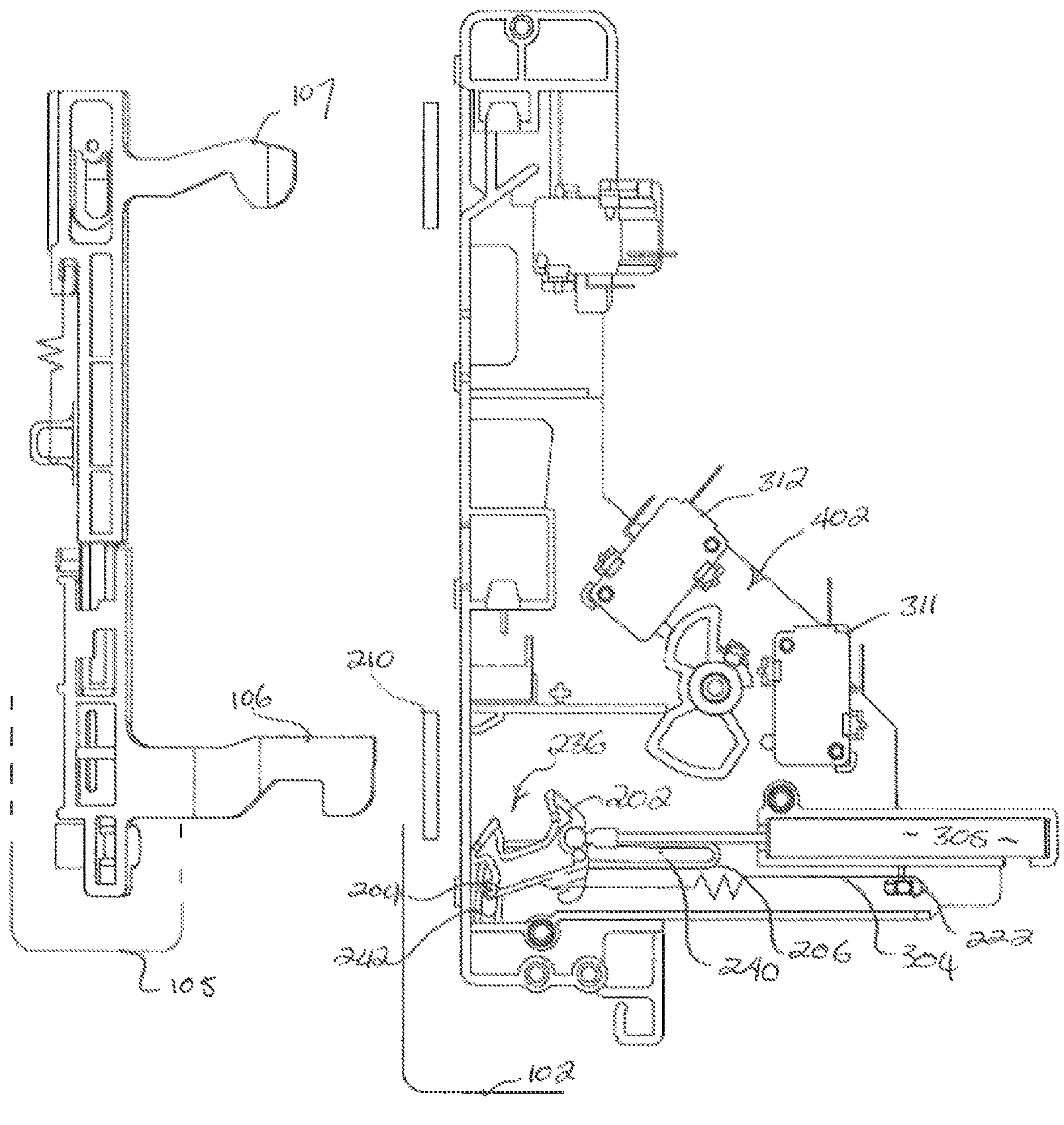
FIG. 19 is a partial section view of a third embodiment showing the upper and lower latch blades of the door prior to entering the oven body.
Figure 20:
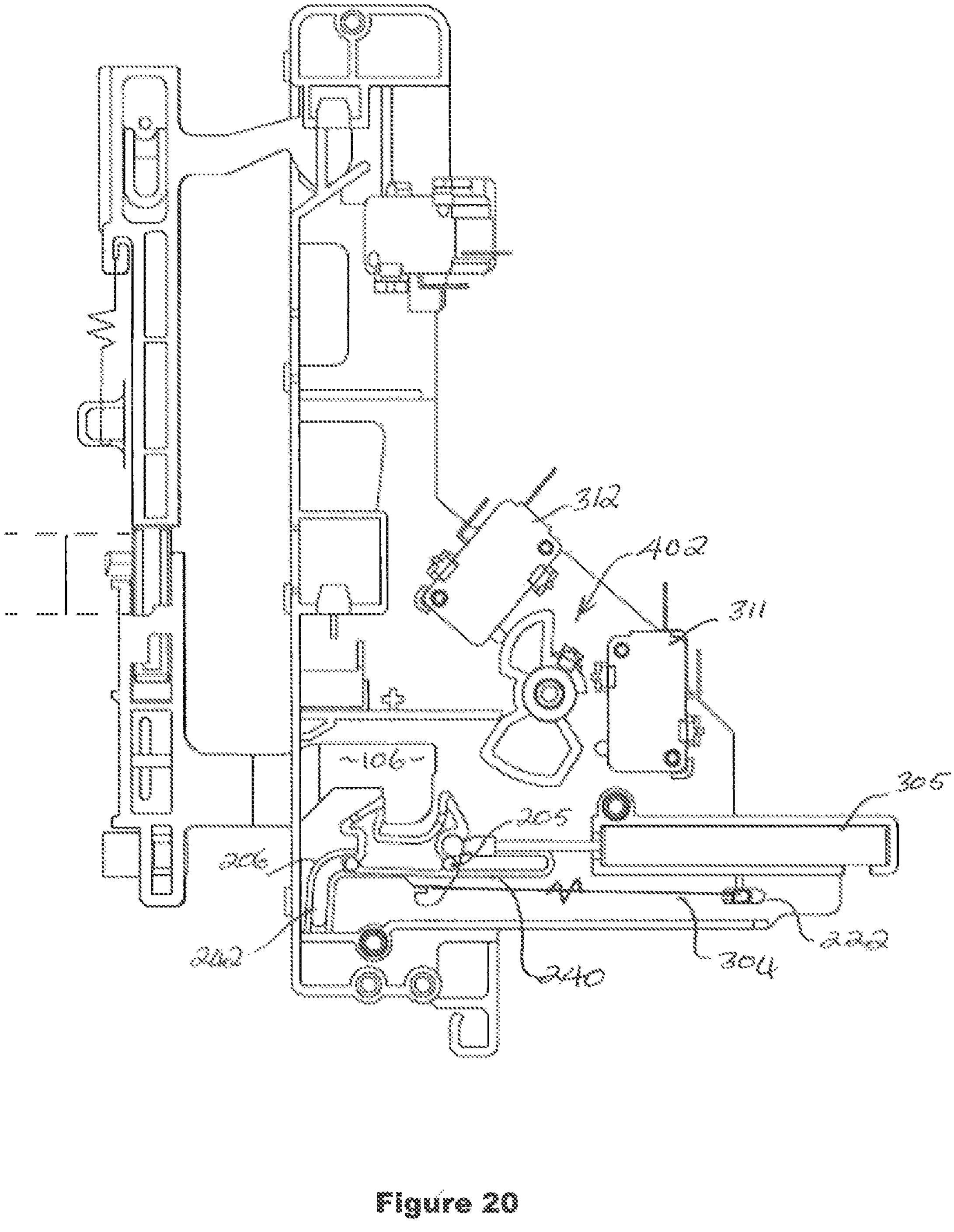
FIG. 20 is a partial section view of the third embodiment with the lower latch blade of the door engaging the catch, and simultaneously rotating the catch to the engaged configuration.
Figure 21:
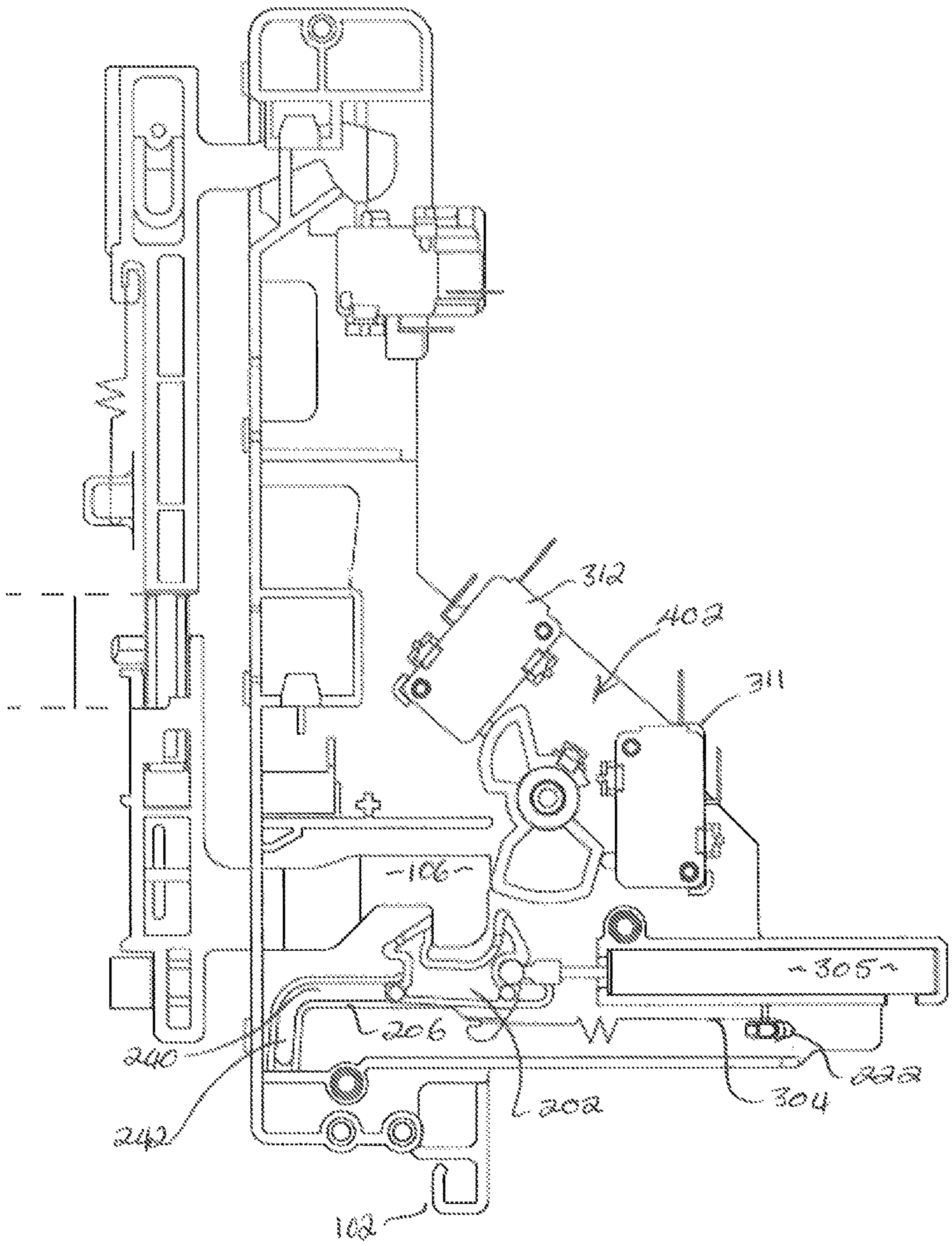
FIG. 21 is a partial section view of the third embodiment showing the lower latch blade of the door moving to the retracted position and engaging one lobe of the rotating cam for actuating the safety switches.
Figure 22:
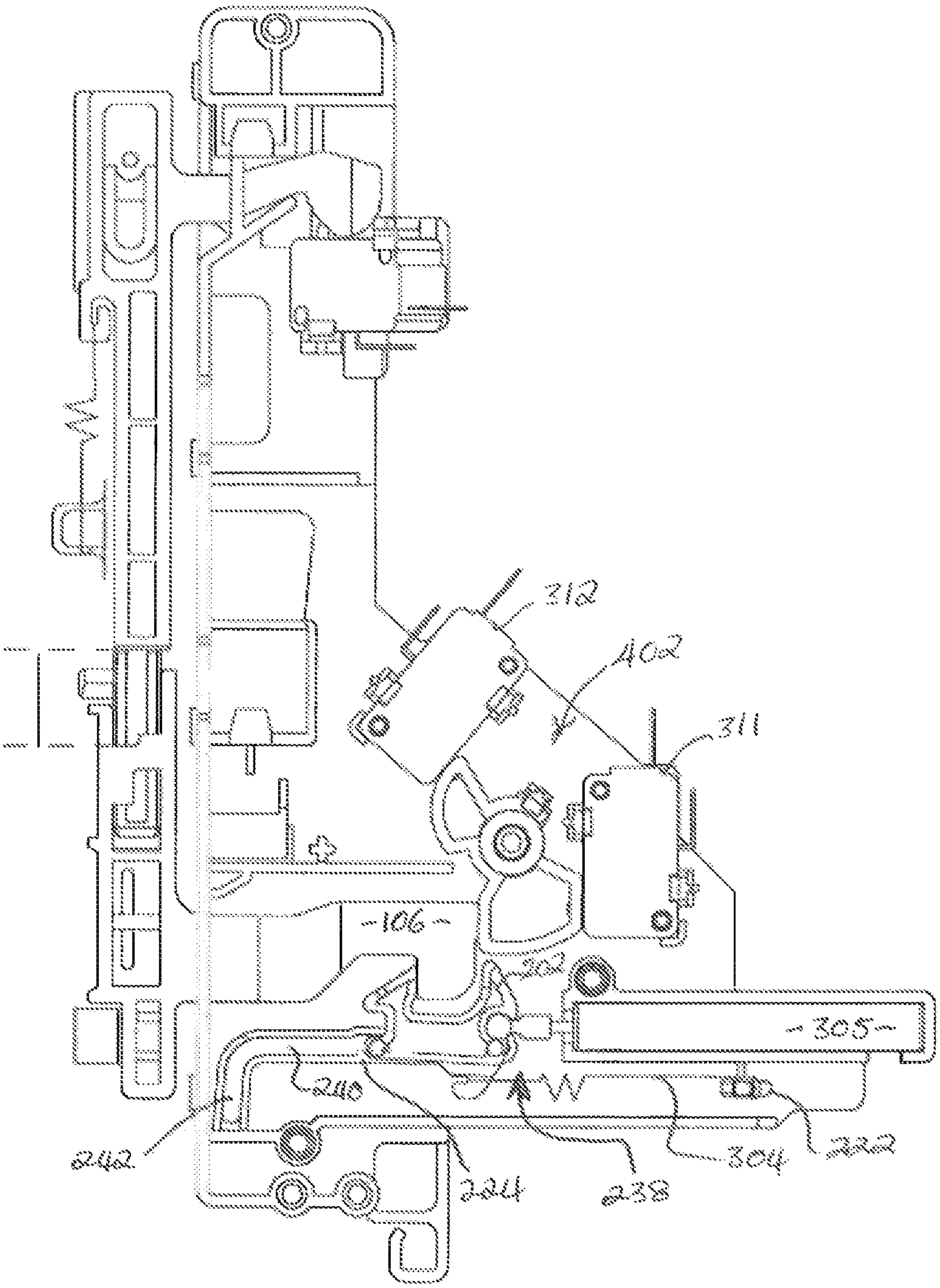
FIG. 22 is a partial section view of the third embodiment showing the door in the closed position with the lower latch blade and the catch in the retracted position within the oven body.
Figure 23:
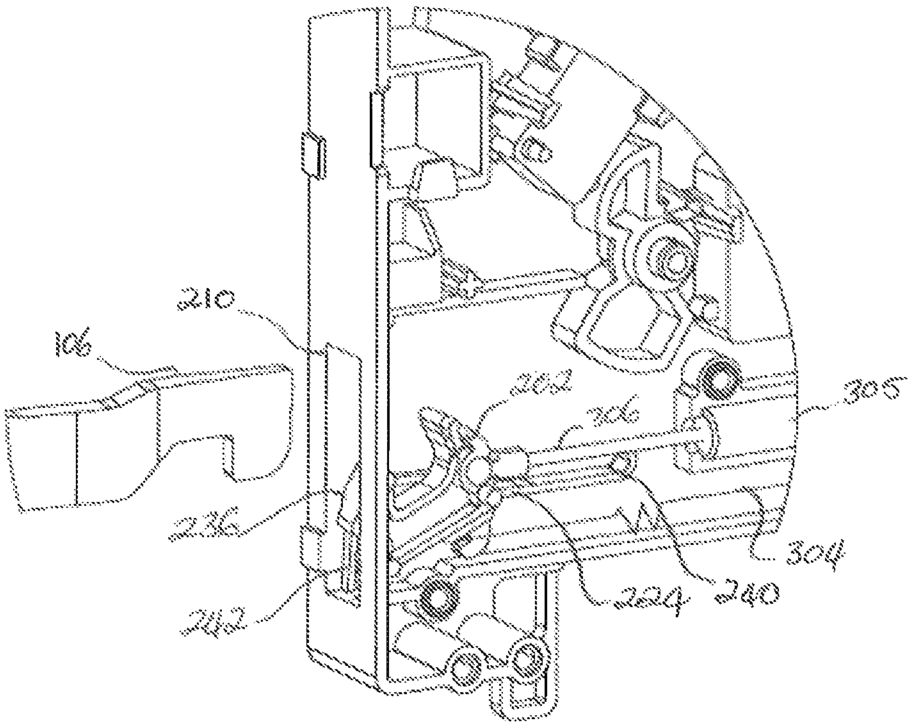
FIG. 23 is a partial section perspective view of the third embodiment showing the lower latch blade of the door prior to entering the body of the oven as shown in FIG. 19.
Figure 24:
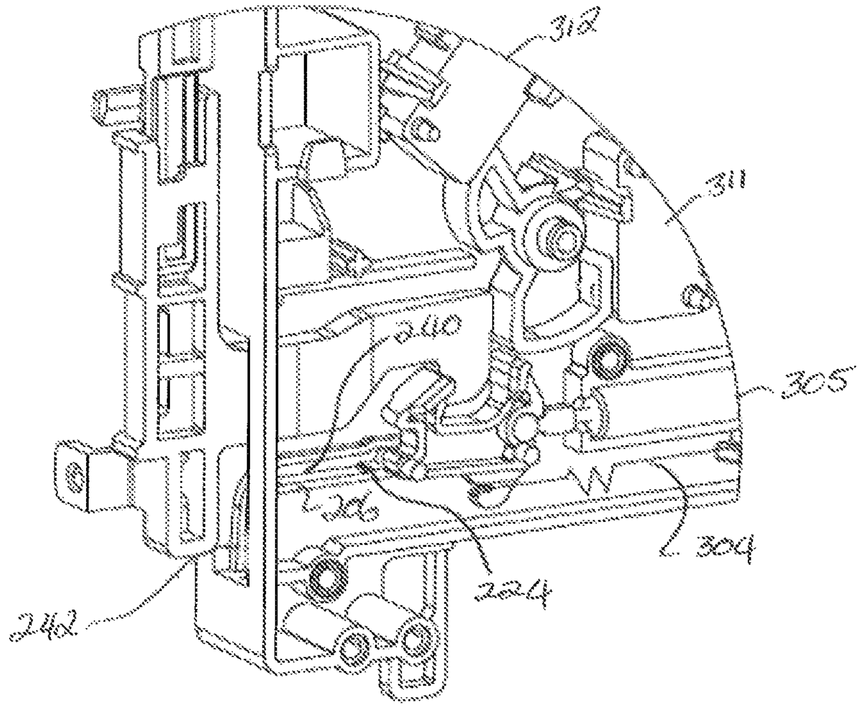
FIG. 24 is a partial section perspective view of the third embodiment showing the door in the closed position with the lower latch blade and the catch in the retracted position within the oven body, as shown in FIG. 22.
Figure 25:
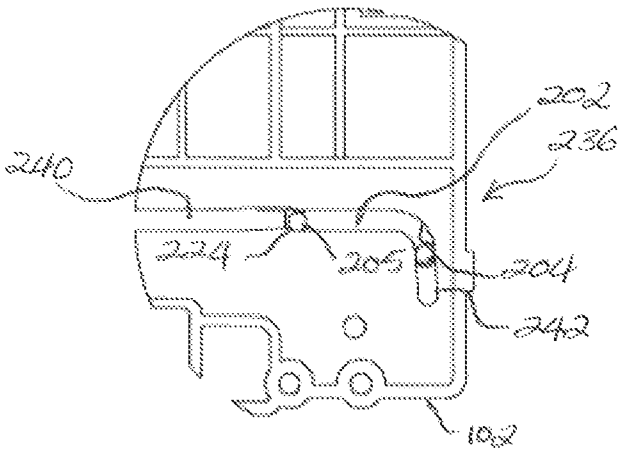
FIG. 25 is an enlarged partial elevation of the third embodiment showing the forward and rear guide pins of the catch in the guide track, at the release configuration, viewed from the side opposing the catch such that movement to the retracted position is to the left in the figure as shown.

FIGS. 19 to 25 show a third embodiment of the door mechanism in which the guide structure 206 has a localized feature 224 to increase friction with the cap 202 when in the extended position 236. The added friction resists movement of the catch 202 toward the retracted position 238 so it is more likely to remain in the release configuration at the extended position (see FIG. 19), even when the door 101 is opened quickly and forcibly. As best shown in FIGS. 19, 23 and 25, the catch 202 has forward and rear guide pins (204 and 205) that slide within the guide structure 206. In the extended position 236, the retraction bias applied by the retraction spring 304 generates a relatively large reaction force between the forward guide pin 204 and the branch 242 of the guide structure 206. This reaction force generates friction between the forward guide pin 204 and the guide structure 206 which is sufficient to hold the catch 202 at the extended position 236 during normal typical use of the door. However, discussed above forcibly wrenching open the door 101 create a dynamic response in the movement of the catch 202 when it rotates to the release configuration. In these situations, it may be at the friction between the forward guide pin 204 and the branch 242 of the guide structure 206 does not prevent the retraction spring 204 simply drawing the catch back to the retracted position 238 (see FIG. 22).

In this embodiment, the guide structure 206 includes a localized feature 224 that increase the reaction force between the rear guide pin 205 and the path 240 of the guide structure 206. The combined friction of the rear and forward guide pins 204, 205 only applies when the catch 202 is in the extended position 236. The combined friction is distributed between both guide pins, the catch 202 is less likely to inadvertently move towards the retracted position 238. However, as shown in FIGS. 23 and 25, the localized feature 224 is simply a small ramp between adjacent sections of the path 240. In this way the resistance to moving the catch 202 back to the retracted position 238 once the latch 106 has forced it from the release configuration, is minimal. Once the rear guide pin 205 has moved past the ramp 224, the bias provided their retraction spring 204 easily overcomes the increase in friction when the forward guide pin is drawn up the ramp when moving to the retracted position 238.

Safety Lock

FIGS. 26 to 35 show a fourth embodiment of the door mechanism in which the biased member is provided in the form of a spring biased safety lock 226 to hold the catch 202 in the release configuration at the extended position 236.

Figure 26:
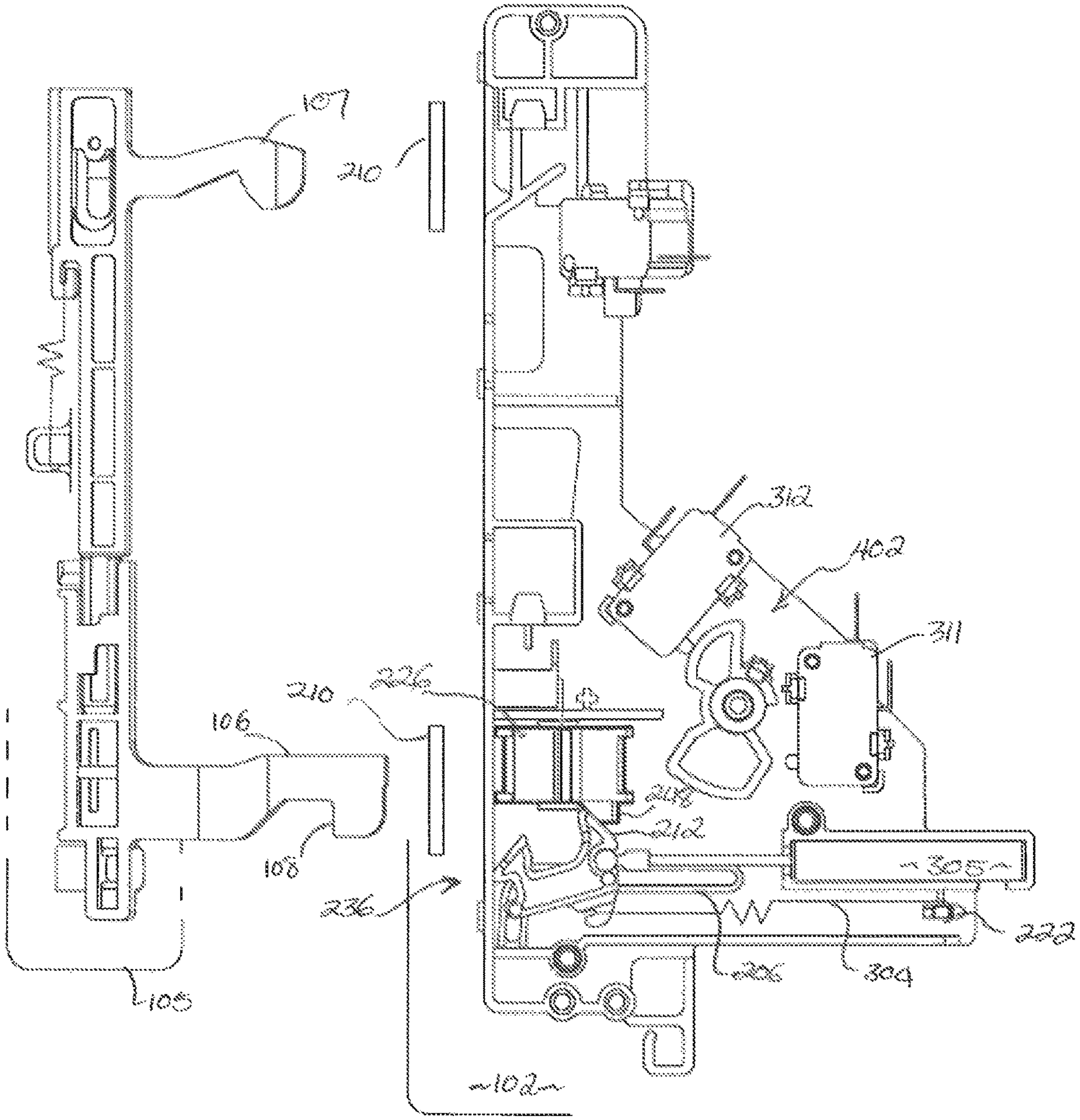
FIG. 26 is a partial section view of a fourth embodiment showing the upper and lower latch blades of the door prior to entering the oven body.
Figure 27:
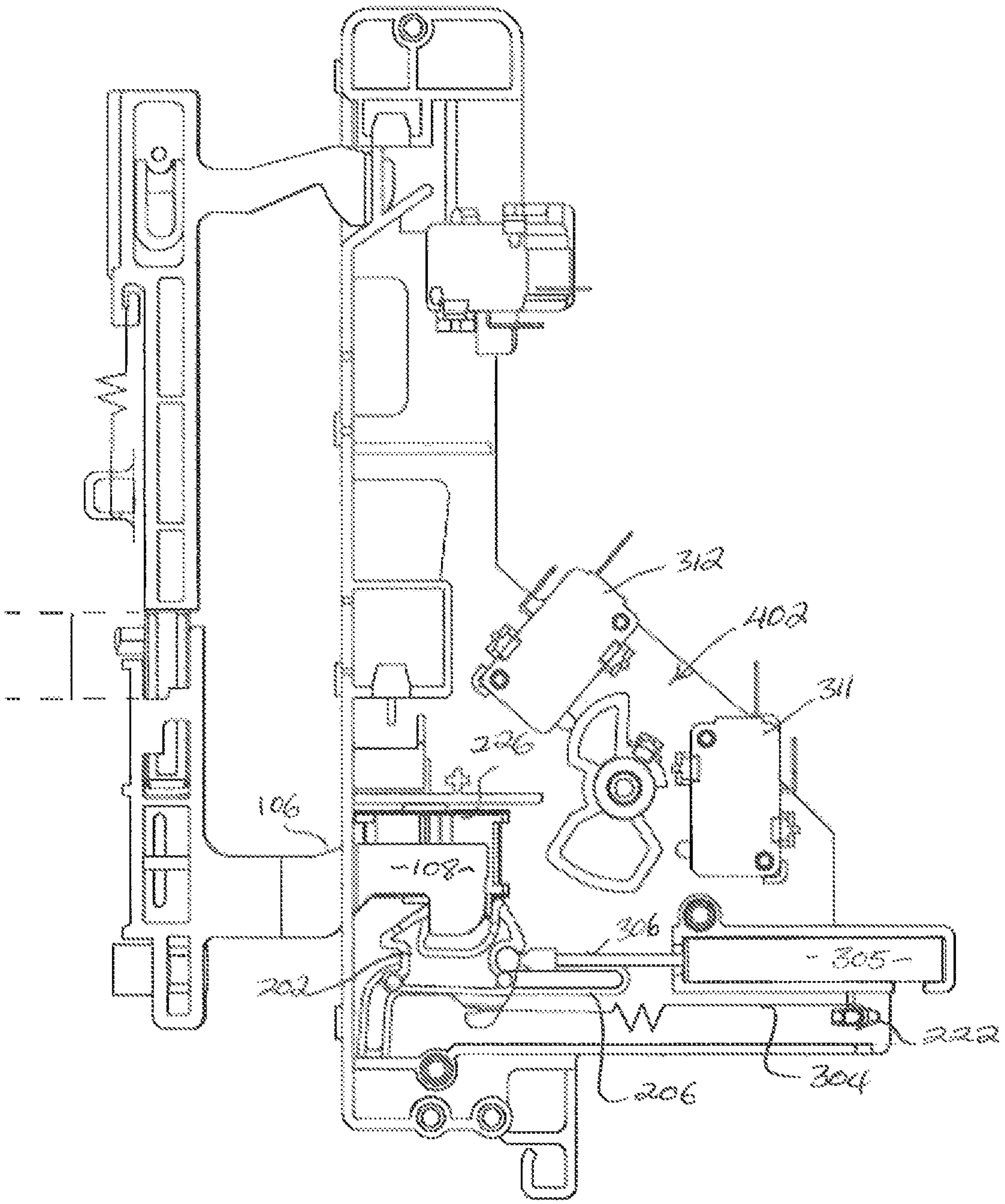
FIG. 27 is a partial section view of the fourth embodiment with the lower latch blade of the door engaging the catch, and simultaneously rotating the catch to the engaged configuration.
Figure 28:
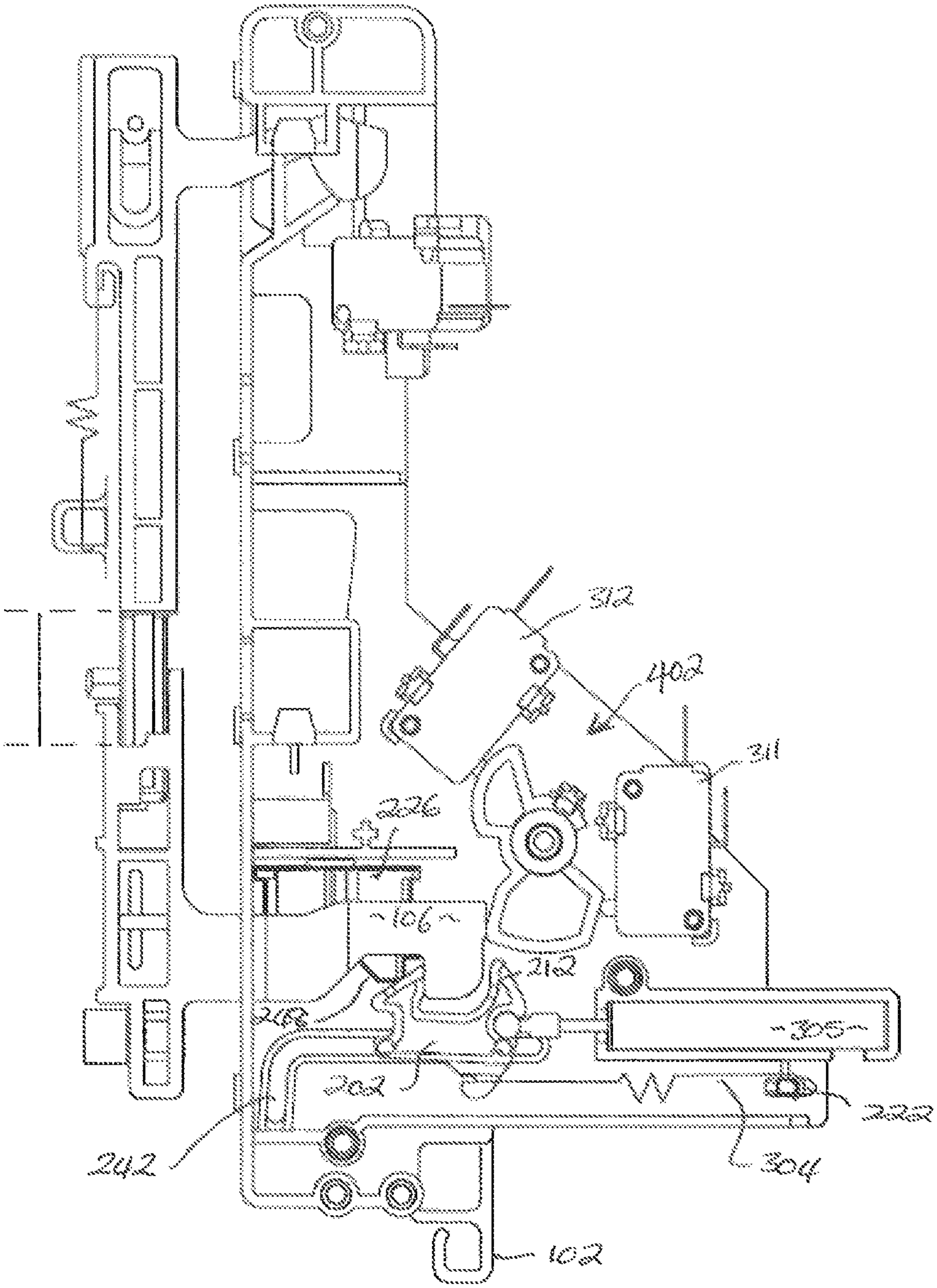
FIG. 28 is a partial section view of the fourth embodiment showing the lower latch blade of the door moving to the retracted position and engaging one lobe of the rotating cam for actuating the safety switches.
Figure 29:
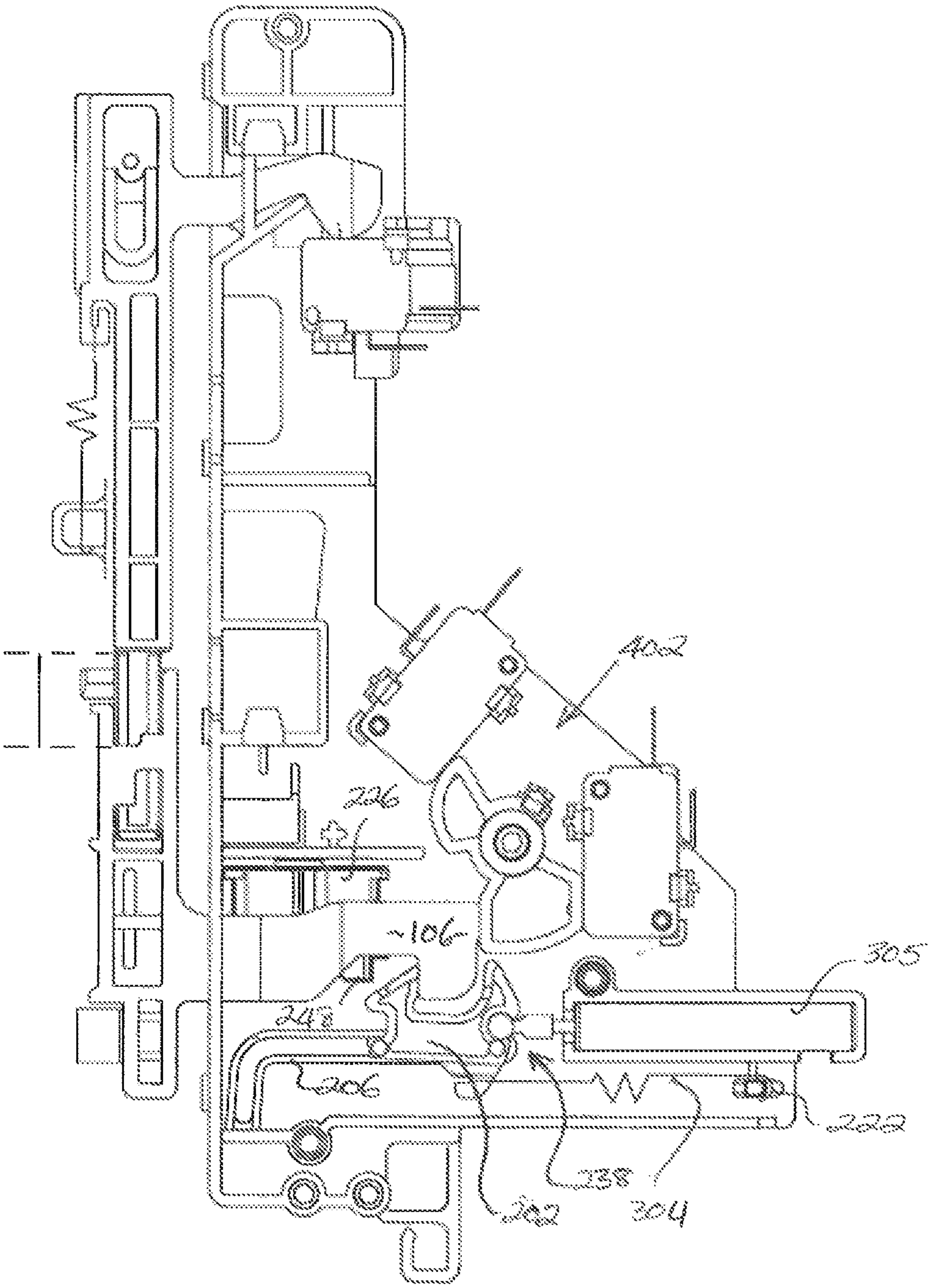
FIG. 29 is a partial section view of the fourth embodiment showing the door in the closed position with the lower latch blade and the catch in the retracted position within the oven body.
Figure 30:
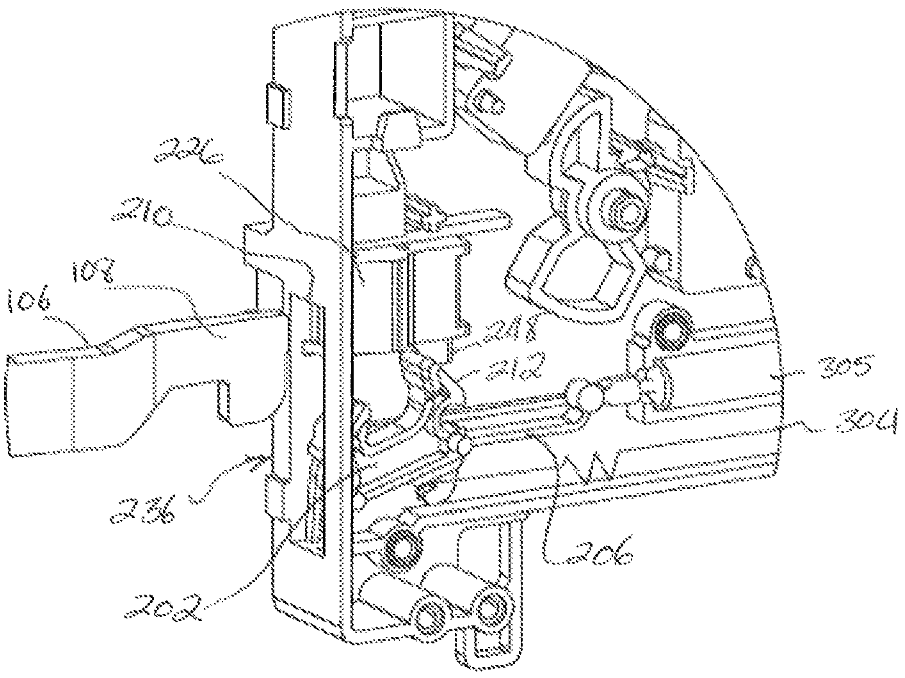
FIG. 30 is a partial section perspective view of the fourth embodiment showing the upper and lower latch blades of the door prior to entering the oven body, as shown in FIG. 26.
Figure 31:
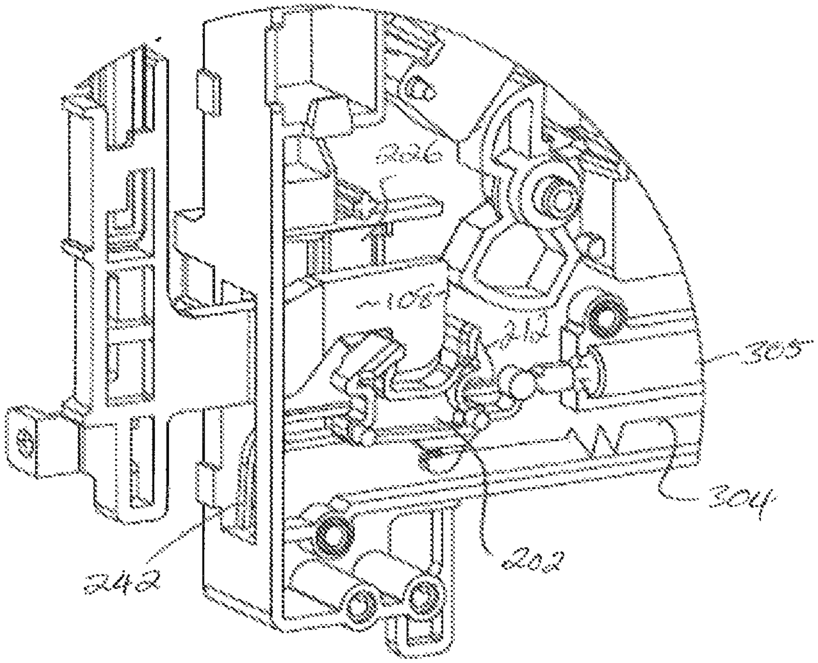
FIG. 31 is a partial section perspective view of the fourth embodiment with the lower latch blade of the door engaging the catch, and simultaneously rotating the catch to the engaged configuration, as shown in FIG. 27.
Figure 32:
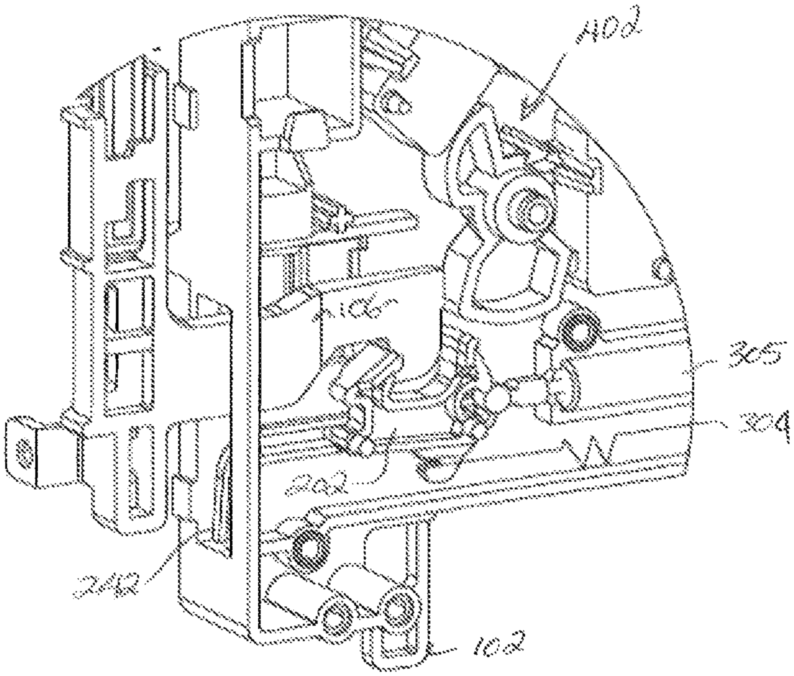
FIG. 32 is a partial section perspective view of the fourth embodiment showing the lower latch blade of the door moving to the retracted position and engaging one lobe of the rotating cam for actuating the safety switches, as shown in FIG. 28.
Figure 33:
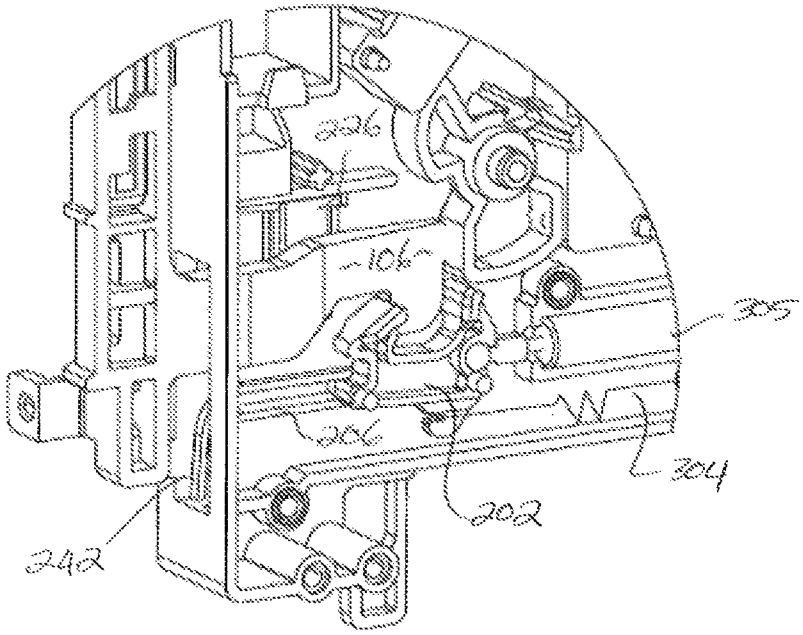
FIG. 33 is a partial section perspective view of the fourth embodiment showing the door in the closed position with the lower latch blade and the catch in the retracted position within the oven body, as shown in FIG. 29.
Figure 34:
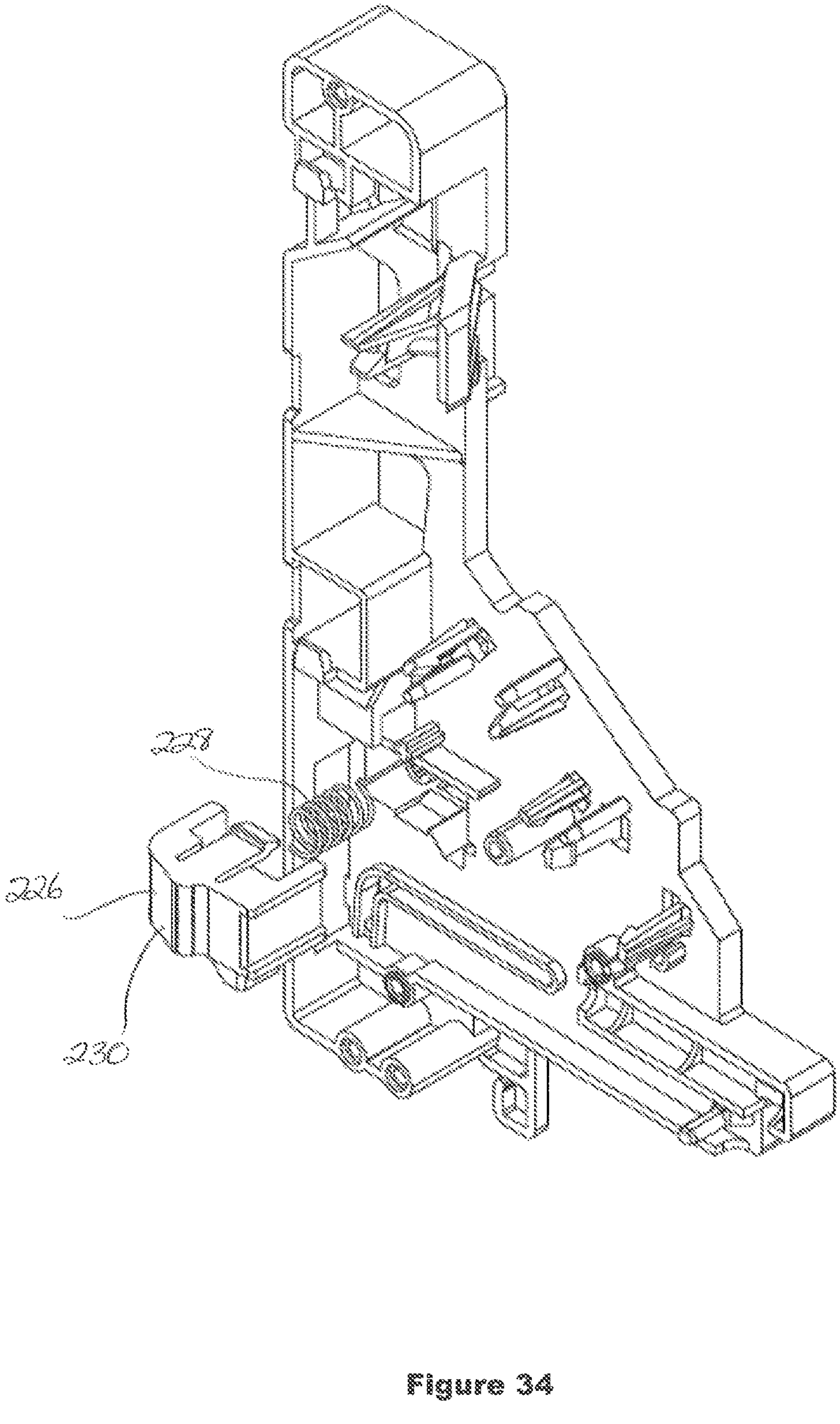
FIG. 34 is an exploded perspective view of the safety lock according to the fourth embodiment, shown in isolation in the interests of clarity; and, FIGS. 35A to 35C are partial plan views of the interengagement between the safety lock and the latch blade as the door is closed.
Figures 35A, 35B, 35C:
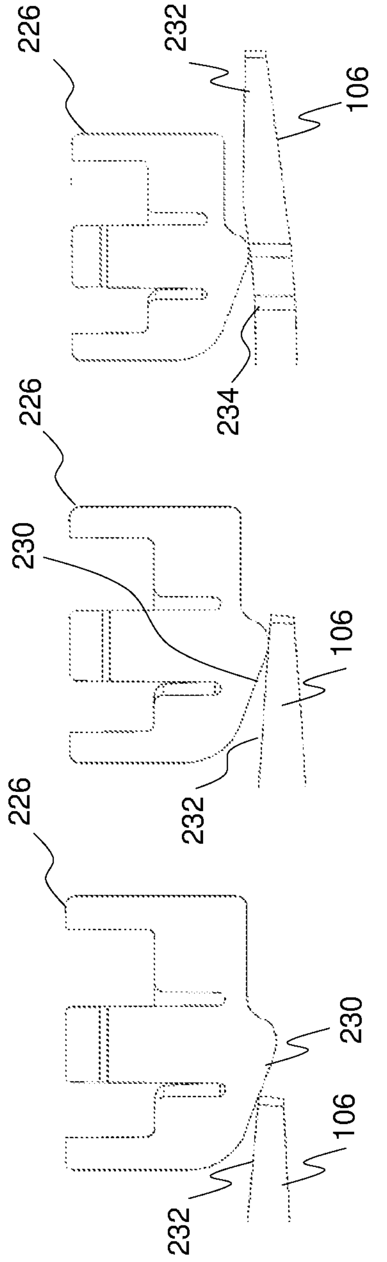

As best shown in FIGS. 26 and 30, the safety lock 226 is biased toward the catch 202 by spring 228 (see FIG. 34) such that the abutment 248 holds the catch 202 from rotating to the engaged configuration. The contact surface of the abutment 248 is complementary to the curved rear surface 212 of the catch 202 to bias and maintain the catch 202 into the release configuration.

As the door closes, the lower latch blade 106 enters the oven body 102 through the slot 210. Referring to FIGS. 27, 31 and 33*a* to 33*c*, the latch blade 106 has a slide surface 232 on the side facing the safety lock 226. As the head 108 of the latch blade 106 moves into the pocket 211 of the catch 202, the slide surface 232 engages the guide surface 230.

The guide surface 230 is inclined to the movement of the latch blade 106 to retract the safety lock 226 away from the catch 202 against the bias of the spring 228. Retraction of the safety lock 226 disengages the abutment 248 from the rear surface 212 of the catch 202. This allows the head 108 of the latch blade 106 to rotate the catch 202 into the engaged configuration.

In this configuration, the head 108 is held in the pocket 211 of the catch 202. The retraction spring 304 draws the catch 202 together with the latch 106 toward the retracted position 238 (see FIG. 29).

As with the other embodiments, moving to the retracted position 238 causes the ends 108 of the latch blade 106 to rotate the cam 402 until the lobes 401 and 405 activate safety switches 311 and 312 respectively. This indicates to the processor (not shown) the lower latch blade 106 is at the retracted position 238 and the door 101 has properly closed.

As with the biased arm 214 of the first embodiment, the friction between the safety lock 226 and the guide surface 232 of the lower latch blade 106, is less than the bias of the retraction spring 304. This ensures the latch blade 106 moves to the retracted position 238 and activates the safety switches 311 and 312. To reduce the friction on latch blade 106, it may include a recessed surface 234 (see FIG. 35*c*) adjacent the guide surface 232. The recessed surface 234 allows the safety lock 232 to partially return back from full retraction such that the spring 228 is less compressed. Reducing the compression of the spring 228 reduces the bias on the safety lock 226 and therefore the contact force on the safety lock on the latch blade 106. A lower contact force directly reduces the friction on the latch blade 106 and hence the resistance to drawing the latch blade 106 to the retracted position.

The recessed surface 234 is positioned on the latch blade 106 such that the safety lock starts to partially return only when the abutment 248 has disengaged the catch 202 and the catch 202 has reconfigured such that the abutment does not re-engage when partially returning.

When the door is opened, the latch 106 and the catch 202 are drawn from the retracted position 238 to the extended position 236 along the path 240 defined by the guide structure 206. As the catch 202 reaches the extended position 236, the forward guide pin 204 is re-directed from the part 240 along the branch 242. This rotates the catch 202 from the engaged configuration to the release configuration so the end 108 of the catch latch blade 106 is released from the pocket 211. As the catch 202 rotates to the release configuration, the safety lock 226 moves the abutment 248 into engagement with the rear surface 212. This ensures an overly forceful opening of the door does not result in the catch 202 returning to the engaged configuration and simply withdrawing to the retracted position 238 thereby rendering the oven inoperable until serviced by a technician.

The invention has been described herein by way of example only. Skilled workers in this field will readily recognize many variations and modifications which do not depart from the spirit and scope of the broad inventive concept.

Reference throughout this specification to "one embodiment" or "an embodiment" or "example" means a particular feature, structure or characteristic described in connection with the embodiment is included in at least one embodiment of the present invention. Thus, appearances of the phrases, "in one embodiment" or "in an example" in various places throughout this specification are not necessarily or referring to the same embodiment or example, but may be combined in any suitable manner, as would be apparent one of ordinary skilled the art from this disclosure.

The invention claimed is:

1. A cooking appliance, including:

a body with an interior for food to be cooked, the body having an opening providing access to the interior;

a door attached to the body to selectively open and close the opening, the door having a latch, and the body having a catch for engaging the latch, the catch being movable between a retracted position and an extended position, wherein movement of the catch into the retracted position causes the catch to rotate from a release configuration, whereby the catch disengages the latch, to an engagement configuration, whereby the catch engages the latch; and, the body having a swing arm to engage the catch when the catch is at the extended position and to disengage the catch when the catch is in the retracted position; wherein, the swing arm is adapted to bias the catch into the extended position and bias the catch to the release configuration.

2. The cooking appliance according to claim 1, wherein the latch is configured to disengage the swing arm from the catch as the latch engages the catch.

3. The cooking appliance according to claim 1, wherein during use, contact between the latch and the catch as the door closes, moves the catch to the engagement configuration.

4. The cooking appliance according to claim 1, wherein during use, the catch is in the engaged configuration when moving between the extended position and the retracted position.

5. The cooking appliance according to claim 1, wherein the body has a soft close mechanism for biasing the catch to the retracted position whereupon the door closes the opening, wherein the soft close mechanism has a retraction spring and a damper to slow movement of the catch to the retracted position by the retraction spring.

6. The cooking appliance according to claim 5, wherein the swing arm is operatively associated with a torsion spring, and wherein the swing arm rotates into biased contact with the catch when in the extended position and the release configuration.

7. The cooking appliance according to claim 6, wherein the swing arm is mounted within the body such that contact with the latch as the door closes rotates the swing arm away from the catch.

8. The cooking appliance according to claim 7, wherein the swing arm is configured for sliding contact with the latch, and the retraction spring has a bias exceeding any friction caused by the sliding contact.

9. The cooking appliance according to claim 1, wherein the body has a guide track for guiding the catch between the extended position and the retracted position, the guide track being configured to rotate the catch into the release configuration at the extended position.

10. The cooking appliance according to claim 1, wherein the swing arm is operatively associated with and a torsion spring, and wherein the swing arm rotates into biased contact with the catch when in the extended position and the release configuration.

11. The cooking appliance according to claim 10, wherein the swing arm is mounted within the body such that contact with the latch as the door closes rotates the swing arm away from the catch.

12. The cooking appliance according to claim 5, wherein the damper is in the form of an oil cylinder with a connecting rod extending between a piston in the oil cylinder to the catch.

* * * * *